US006764247B1

(12) United States Patent
Kronenberg

(10) Patent No.: US 6,764,247 B1
(45) Date of Patent: Jul. 20, 2004

(54) PLUG-IN CONNECTOR FOR HOLLOW SECTIONS

(76) Inventor: Max Kronenberg, Bünkenberg 2, D-42657 Solingen (DE)

( * ) Notice: Subject to any disclaimer, the term of this patent is extended or adjusted under 35 U.S.C. 154(b) by 0 days.

(21) Appl. No.: 09/525,333

(22) Filed: Mar. 10, 2000

Related U.S. Application Data

(63) Continuation of application No. PCT/EP98/05763, filed on Sep. 10, 1998, and a continuation of application No. PCT/EP98/06830, filed on Oct. 28, 1998.

(30) Foreign Application Priority Data

| | | |
|---|---|---|
| Sep. 11, 1997 | (DE) | 297 16 378 U |
| Oct. 30, 1997 | (DE) | 297 19 208 U |
| Aug. 25, 1999 | (DE) | 299 14 919 U |

(51) Int. Cl.[7] .......... F16B 7/00

(52) U.S. Cl. .......... 403/292; 403/298; 403/297

(58) Field of Search .......... 403/300, 301, 403/294, 292, 302, 286; 52/456, 665, 314, 664; 411/477–479

(56) References Cited

U.S. PATENT DOCUMENTS

| | | | | |
|---|---|---|---|---|
| 2,287,964 A | * | 6/1942 | Beegle | 411/478 |
| 3,627,362 A | * | 12/1971 | Brenneman | 411/460 |
| 4,608,802 A | * | 9/1986 | Bayer | 52/204.599 |
| 5,209,599 A | * | 5/1993 | Kronenberg | 403/292 |
| 5,560,731 A | * | 10/1996 | Kronenberg | 403/292 |
| 6,318,943 B2 | * | 11/2001 | Joyce | 411/478 |

FOREIGN PATENT DOCUMENTS

| | | | |
|---|---|---|---|
| DE | 94 11 067.0 | | 10/1994 |
| DE | 4444888 A | * | 6/1995 |
| DE | 29511885 U1 | * | 12/1996 |
| EP | 0 133 655 A2 | | 3/1985 |
| GB | 2321924 A | * | 8/1998 |

* cited by examiner

*Primary Examiner*—Lynne H. Browne
*Assistant Examiner*—Aaron Dunwoody
(74) *Attorney, Agent, or Firm*—McGlew and Tuttle, P.C.

(57) ABSTRACT

A plug-in connector (1) for hollow sections (2, 3) of spacers for insulating glass panes. The plug-in connector (1), which has a U-shaped cross section, has stops (13) which are arranged at the transition between the side webs (9) and the middle web (8). The plug-in connector (1) may also have on the inside an elastic sealing body (7), which projects outwardly beyond the contour of the plug-in connector (1) at least in the area of the connector point (6) and is sealingly in contact with the walls of the hollow sections (2, 3).

18 Claims, 22 Drawing Sheets

Fig. 11
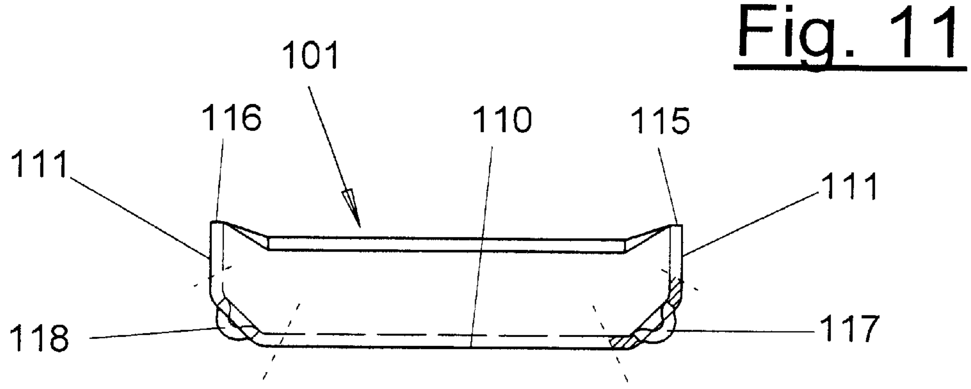
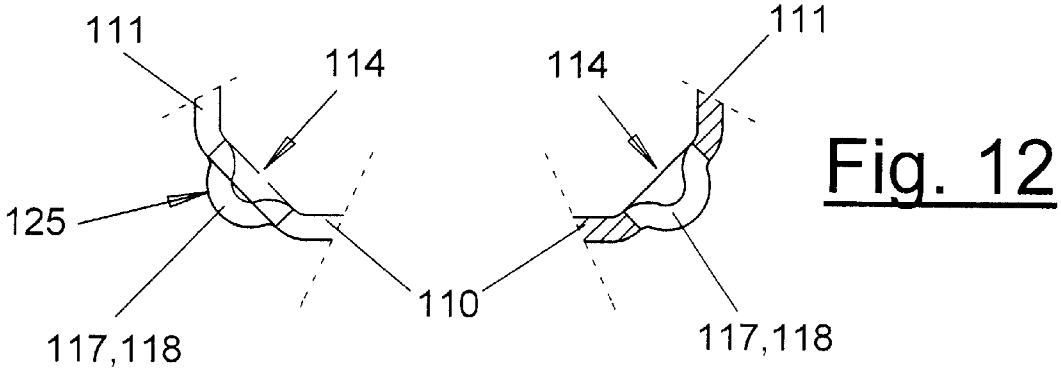
Fig. 12
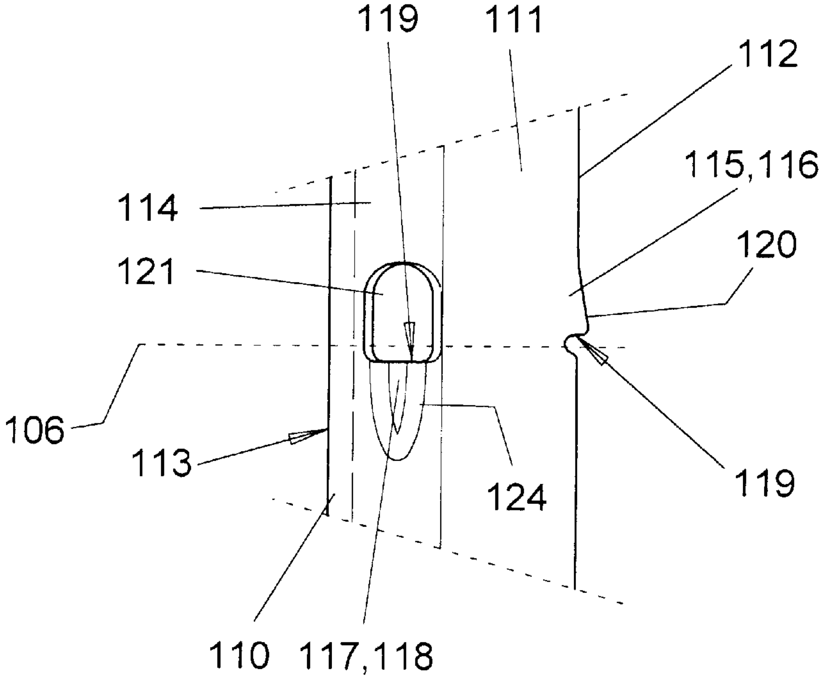
Fig. 10

Fig. 21
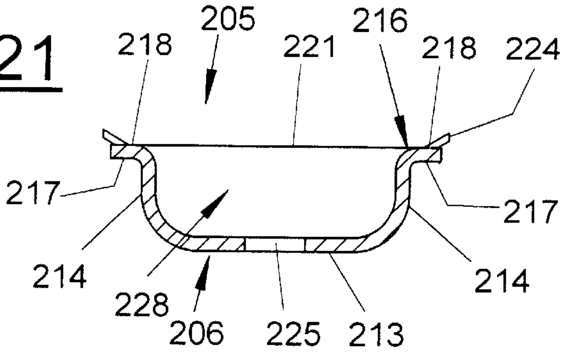
Fig. 20
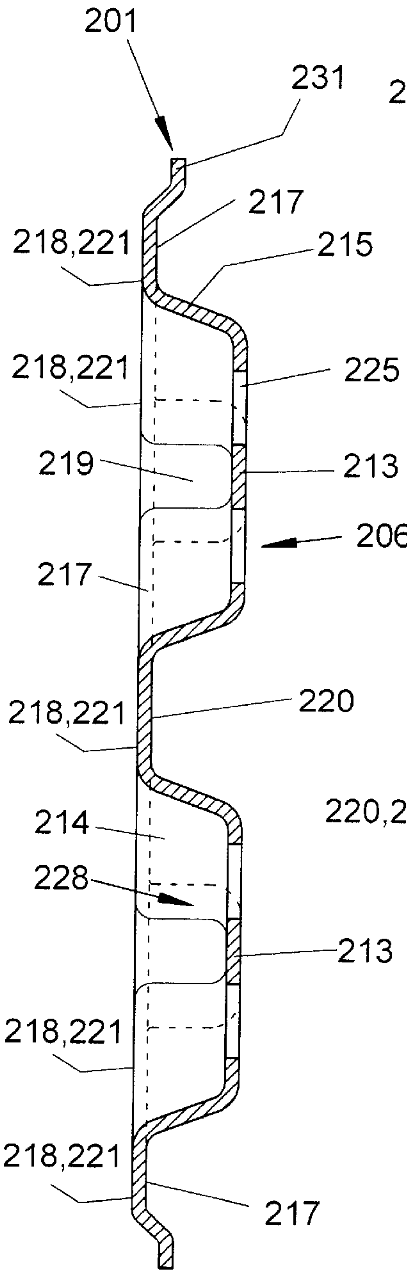
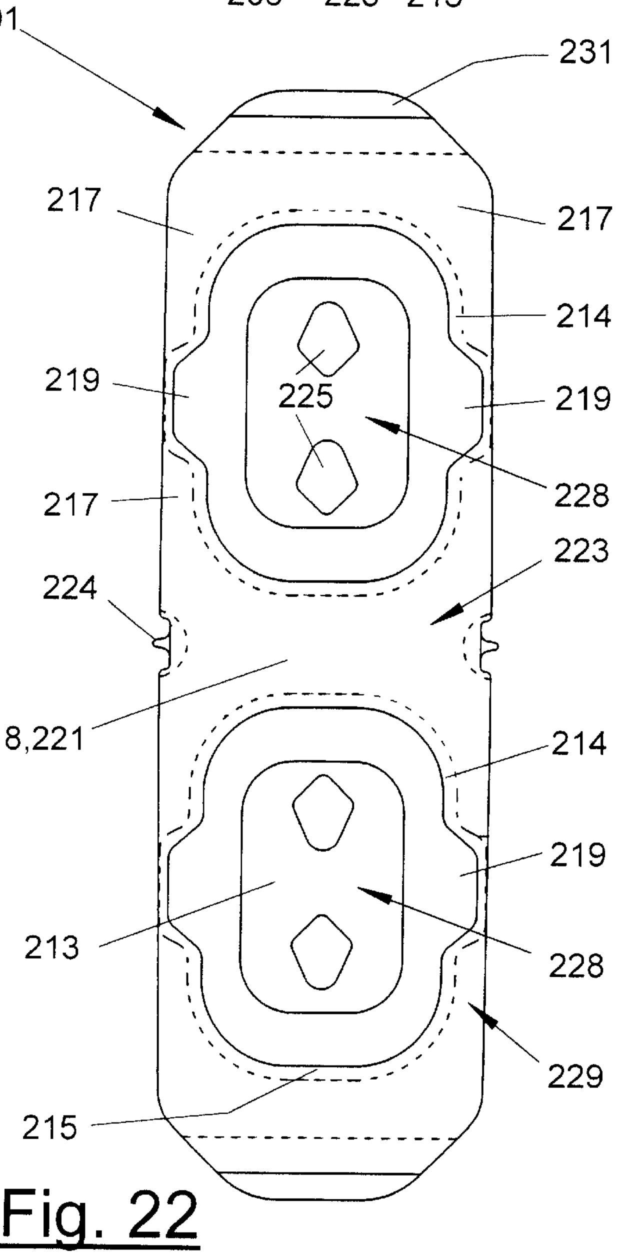
Fig. 22

Fig. 33
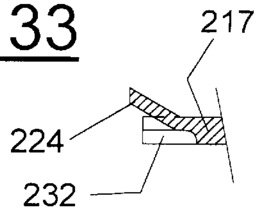
Fig. 32
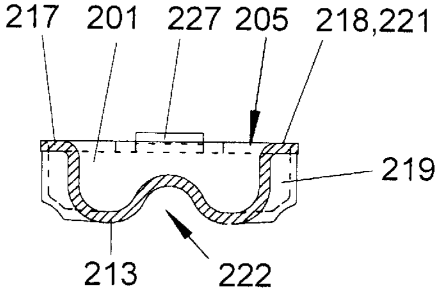
Fig. 34
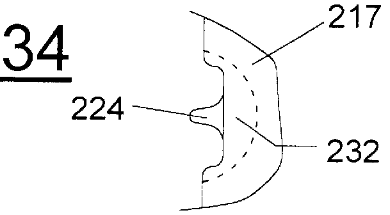
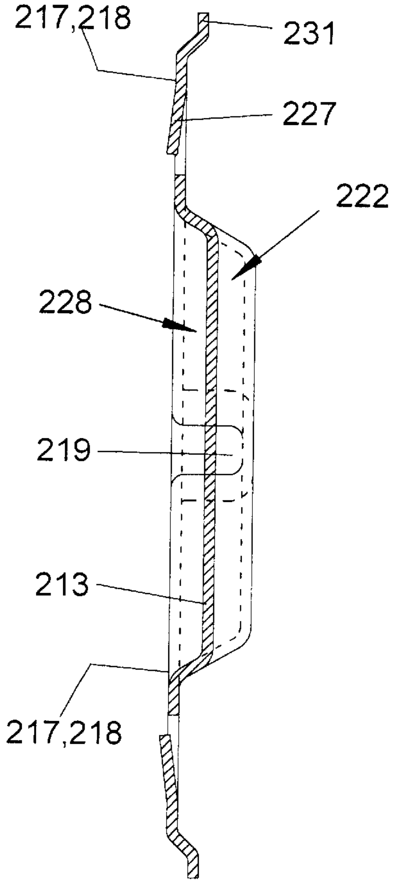
Fig. 30
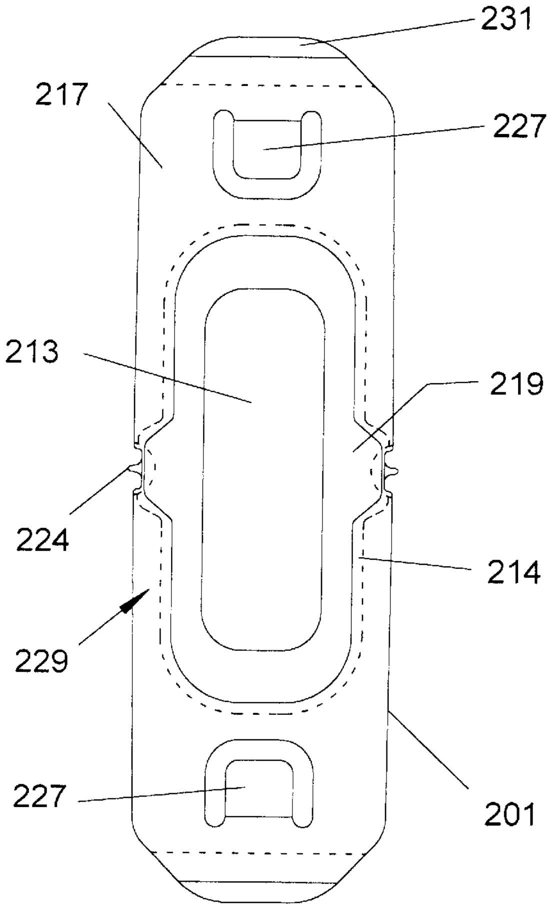
Fig. 31

Fig. 56
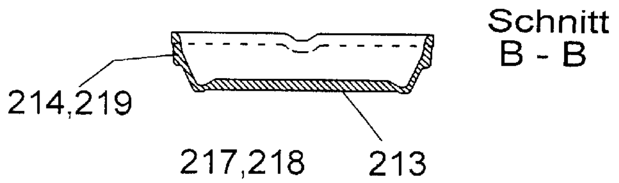
Fig. 55
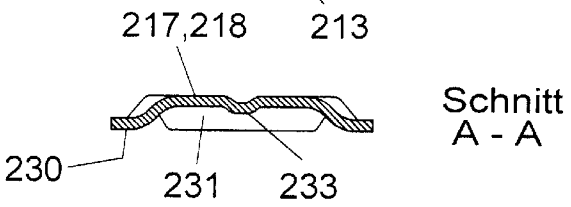
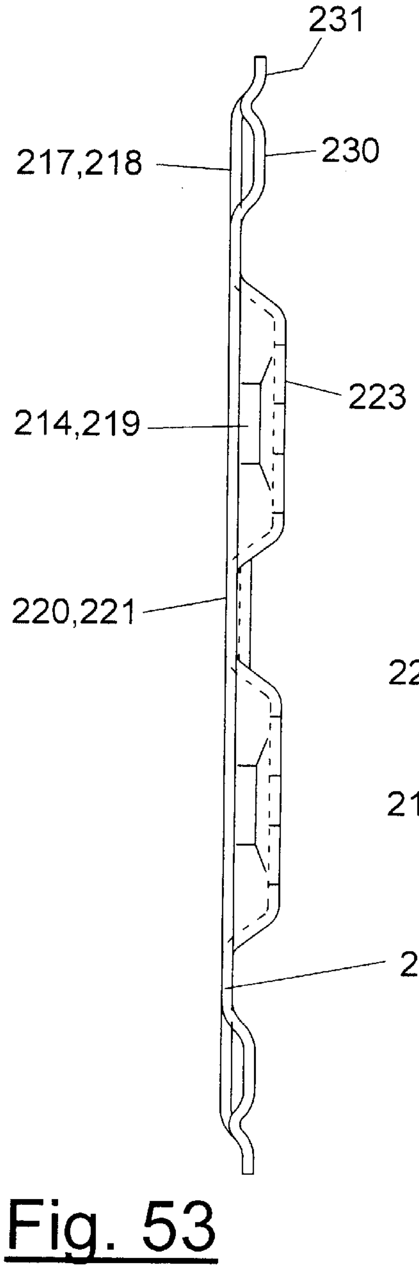
Fig. 53
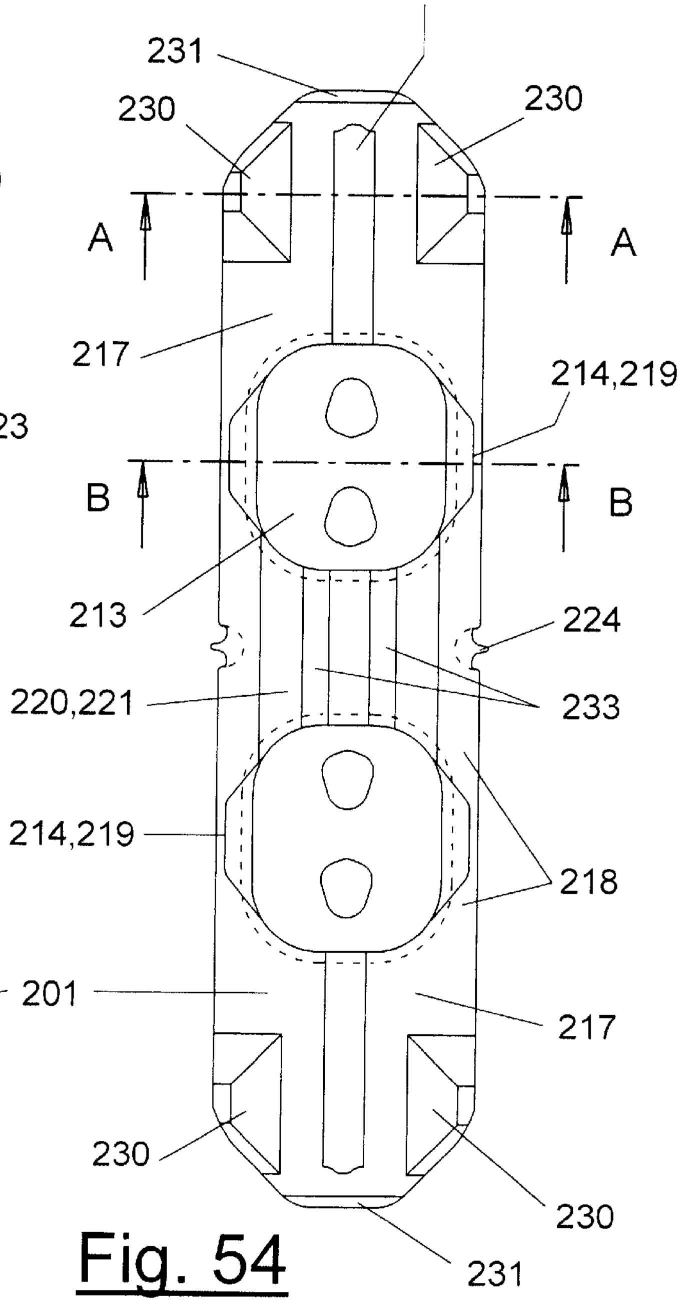
Fig. 54

Fig. 60
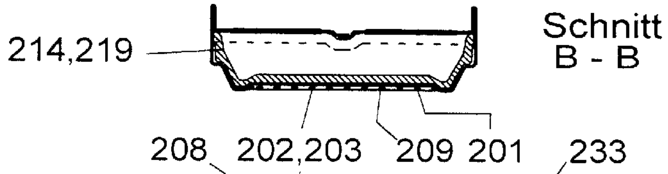
Fig. 59
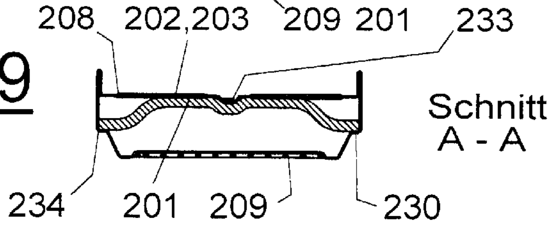
Fig. 57
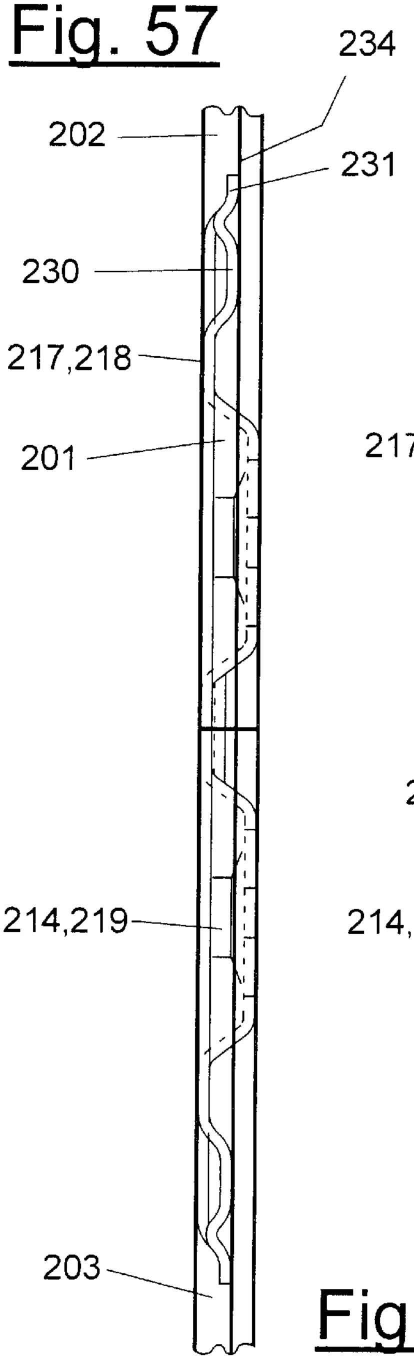
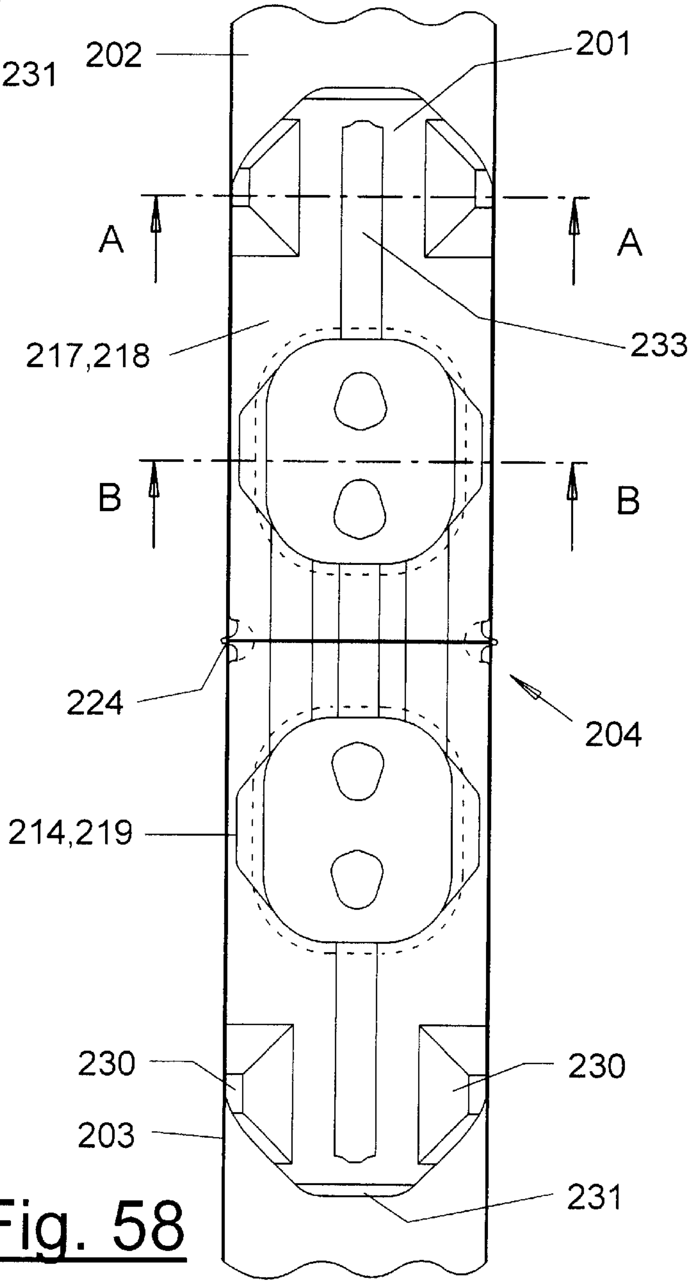
Fig. 58

PLUG-IN CONNECTOR FOR HOLLOW SECTIONS

CROSS REFERENCE TO RELATED APPLICATIONS

This application is a Continuation of PCT International Application PCT/EP98/05763 of Sep. 10, 1998 which designates inter alia the United States and is a Continuation of Application PCT/EP98/06830 of Oct. 28, 1998, which designates inter alia the United States.

FIELD OF THE INVENTION

The present invention pertains to a plug-in connector for hollow sections, especially of spacers of insulating glass panes, and in particular to a plug-in connector with an essentially U-shaped or box-shaped cross section having at least one middle web and side webs, which has stops in the area of the connection point of the hollow sections.

BACKGROUND OF THE INVENTION

Such a plug-in connector has been known from DE-U-94 11 067. It has an essentially U-shaped cross section with a middle web and two side webs. At the free end of the side webs, it has a fixed stop acting in one direction, wherein the stops act in opposite directions and are arranged set back in relation to one another in the area of the connection point of the hollow sections. These stops can cooperate with exposed spring bosses in the middle area of the middle web. These spring bosses are set back far from the connection point and act as retaining elements, whose unintentional pulling out of the plug-in connector is also to prevent the hollow profiles. In addition, in another embodiment, this document shows a plug-in connector with two rigid stops in the form of knobs acting in two directions, which are arranged on the middle web and at a laterally spaced location from the side webs.

The prior-art plug-in connector is particularly suitable for relatively thick-walled hollow sections that have a high dimensional stability. However, very thin-walled sections made also of stainless steel have meanwhile also become available in the course of the development of sections. These sections do not have such a high dimensional stability and may undergo deformation during forming to size, such as by cutting or sawing. It is difficult in such sections to find the center during the introduction of the plug-in connector and to bring the stop intended for this purpose into contact. Because of the small wall thickness of the section, the stop should also have a relatively small height.

Such a plug-in connector has been known from EP-A 0 133 655. It is used to connect hollow sections of spacer frames which are provided for insulating glass panes. The plug-in connector is sealed at the connection or junction point of the hollow sections by a sealant consisting or butyl or the like, which is injected on the connector during the assembly of the hollow sections. The sealant is introduced into the space between the outside of the connector and the adjacent wall of the hollow section. The sealing is complicated and expensive. In addition, tightness is not always guaranteed reliably and does not act on all sides of the plug-in connector. Mainly moisture effects and diffusion phenomena at the connection point shall be counteracted with the butyl injected. The sealing of the connection point against the entry of the granulated desiccant present in the hollow sections is caused in the prior-art plug-in connector by a massive shape and by adaptation to the shape of the hollow sections, but this can be achieved only insufficiently because of the tolerances of the section.

A similar plug-in connector with a middle web trough and an outside butyl seal is shown in DE-G-92 09 382. This plug-in connector comprises two shell halves, which form with one another a tube, which is permeable to the desiccant and bridges over the connection point. Transversely extending bottom ribs are provided on the lower connector half for sealing against dust of the granular material.

SUMMARY AND OBJECTS OF THE INVENTION

The primary object of the present invention is to show a plug-in connector that is also suitable for thin-walled and dimensionally labile hollow sections.

This object is accomplished by the present invention with a plug-in connector having a middle web, and first and second side webs arranged at opposite lateral sides of the middle web to form one of a U-shaped or box shaped cross section for insertion into, and connection of, the hollow sections. A transition portion is formed between each of the side webs and the middle web. The plug-in connector according to the present invention is equipped with preferably fixed stops, which are arranged in the transition between the middle web and the side webs of the plug-in connector. As a result, guide slopes of the stops act in the corner areas of the hollow section, where they have sufficient resistance to deformation due to the bending deformation of the hollow section and sufficient support. Also corner areas of the hollow sections are usually deformed the least.

The hollow sections have a cross section is adapted to the plug-in connector, and can slide up the guide slope. The guide slopes pull the hollow section pushed on against the opposite edge of the side webs. The hollow section can be supported here, on the one hand, and it is reliably guided. The edge of the web may have a smooth, continuous edge for this purpose at least in the area of the connection point. As an alternative, additional fixed stops may, however, also be present here, with which the hollow section comes into contact.

Due to the guide slopes and the tensioning between the hollow section and the plug-in connector, the stops come reliably into contact with the front wall of the pushed-on hollow section. As a result, the center can be reliably found during the introduction of the plug-in connector even in the case of greatly deformed hollow sections. The sections can tightly abut against one another at the connection point.

It is particularly advantageous for the stops and their guide slopes to have an outwardly convexly arched shape. Due to their position and design, they can act exactly in the corner area of the hollow sections and improve as a result the above-mentioned stop and center-finding function and stabilize the hollow section itself.

The plug-in connector according to the present invention may have an elastic sealing body, which ensures a reliable, simple and inexpensive sealing at the connection or junction point of the hollow sections. The sealing body is especially more favorable than, e.g., the sealing known from EP-A-0 133 655, in which a sealing compound consisting of butyl or the like is sprayed into an inner free space during the assembly of the connection point in the hollow sections. The sealing body makes possible, in particular, a reliable sealing against fine dust, which may be formed from the granulated desiccant present in the spacer frame.

The elastic sealing body also offers the advantage that it can be handled with ease. Due to its oversize, it is compressed during the assembly and is in contact with the connection point of the hollow sections to be sealed under pressure. This ensures an improved sealing action.

The plug-in connector may have in its wall a plurality of openings, through which the elastic sealing body can exit during the compression and can come sealingly in contact with the wall of the hollow section. On the one hand, these may be the recesses on the stops and guide slopes located in the corner area. On the other hand, recesses may also be present at the opposite edge of the web for the lateral passage of the sealing body.

For fixing and guiding the sealing body, it is favorable for the plug-in connector to have a suitable hollow space, in which the molding may be arranged optionally with a fitting shape. It can be fastened in a simple manner, e.g., by a bonded connection.

To improve the compressive and sealing action, it is advantageous for the plug-in connector to have a projection at the wall or middle web located opposite the opening of the hollow space. The projection arches the sealing body increasingly through the opening of the hollow space to the outside in the area of the connection point.

The elastic sealant in one or more hollow spaces of the plug-in connector offers the advantage that it has improved sealing action and a larger area of influence. The sealing of the connection point of the hollow sections is guaranteed with a higher level of reliability. Even very fine dust of the granular desiccant ground during the bending of the hollow sections is kept reliably away from the connection point. The sealant preferably fills the hollow space or hollow spaces of the plug-in connector at least extensively. Due to its oversize, the elastic sealant is compressed during the assembly of the hollow sections and is then in contact with the walls of the hollow sections under pressure and with improved sealing action.

Moreover, the sealant can be handled more easily and it offers cost advantages due to the possibility of using less expensive materials. In addition, the plug-in connector can be equipped with the sealant in advance, which facilitates handling even more and also offers advantages in case of mechanical assembly of the plug-in connector in the hollow sections.

The plug-in connector preferably has a U-shaped cross section and is mounted with the open U side facing the inside of the pane and of the frame. The sealant now seals the open U-side over a large area against the adjacent walls of the hollow space and compensates tolerances of the section. Moreover, the sealant can exit to the outside at various additional openings of the wall of the hollow space and exert a sealing action. This additionally leads to a sealing function especially in the area of middle stops, retaining bosses or the like.

The plug-in connector may have any desired design. It may be either a bent corner connector or a straight connector. There are additional possibilities of variation within these basic types.

The possibilities of designing the sealant are also variable. It may be designed as an initially liquid or pasty and subsequently binding sealing compound or as a prefabricated, pad-like sealing body. The sealing compound can be anchored in the plug-in connector in a positive-locking manner in a simple and inexpensive manner by means of wall openings or tongue-like sealant holders. A sealing body may be bonded or fastened in another way.

Various possibilities are available for sealing the connection point. The sealing may be performed by placing the sealant directly on the connection point, which offers advantages, e.g., in the case of pad-like sealing bodies. In the case of readily deformable, e.g., thin-walled hollow sections made of stainless steel, it is advantageous to leave out the sealant at the connection point and to perform the sealing in the vicinity before and behind the connection point. On the one hand, larger sealing surfaces are available there, while, on the other hand, an undesired scraping off of the sealant by deformed walls of the section during assembly and a possible escape of the scraped-off particles through the initial gap at the connection point are prevented by the opening. Such an opening in the sealant may also be advantageous in case of a sealing compound that is filled in.

According to another aspect of the invention, a plug-in connector for hollow sections of spacer frames of insulating glass panes. The plug-in connector has at least one trough shape, is adapted to the cross section of the section, is open on one side and has a middle web, which points toward the outside of the frame in the fitting position. The plug-in connector has a plurality of side webs. The side webs have the broadened foot surfaces at least in some areas at the web edges pointing toward the inside of the frame for sealed contact with the bottom of the section.

The broadened foot surfaces on the side webs of the trough shape have the advantage that they ensure better sealing against the dust of the granular desiccant. In addition, the plug-in connector has a better and firmer hold in the hollow sections. The broadened foot surfaces are preferably present at least at the longitudinally extending side webs. In addition, the cross webs may also have broadened foot surfaces, which improves the tightness even more.

In the preferred embodiment, the broadened foot surfaces are formed by laterally projecting web flanges, which preferably project to the outside. This shape has the advantage that the plug-in connector can be guided at the edge of the web flanges in the hollow sections in the lower area. This ensures an especially secure hold. In addition, the side webs may be set back in relation to the edges of the web flanges at least in some areas. Due to the narrower shape, this facilitates the introduction of the plug-in connector into the hollow sections. In addition, a free space is formed due to this shape toward the side walls of the section, in which desiccant may accumulate and can almost reach the connection point of the hollow sections or it may even flow over this connection point if the connector has a corresponding design. The necessary tightness against the interior space of the panes is nevertheless maintained due to the broadened foot surfaces and the web edges.

Side beams, which are guidingly and sealingly in contact with the side walls of the section, may be additionally present on the side webs for the lateral guidance of the plug-in connector. These side beams may also form a stop for the granular material and ensure the distributed arrangement of the desiccant. In addition, the side beams reinforce and stabilize the plug-in connector.

The front-side web flanges have an oblique stop boss preferably at the ends and side support humps. Due to their oblique stop faces, these ensure easier introduction of the plug-in connector into the hollow section, on the one hand. On the other hand, the height of the stop bosses and support humps is coordinated with the shape of the hollow sections such that they can be in contact with the roof of the section pointing toward the outside of the frame and offer an additional support for the plug-in connector. This is particularly favorable for thin-walled hollow sections. In addition, the stop bosses and support humps have a certain straightening function, with which possible deformations of the walls of the section are straightened and corrected during the pushing in of the plug-in connector.

In a preferred embodiment, the middle web has, in the area of the connection point of the hollow sections, a depression, which is directed at right angles to the longitudinal axis of the connector, extends to the bottom of the section and preferably forms a broadened, sealing foot surface there to cover the connection point. This shape improves the sealing of the connection point toward the interior of the frame. In addition, the edges of the hollow sections are stabilized. The design of the plug-in connector according to the present invention is especially advantageous for very thin-walled hollow sections, which consist of, e.g., stainless steel and lack good dimensional stability due to being thin-walled. Such hollow sections may undergo undesired deformation during cutting off, but they are again straightened by the plug-in connector according to the present invention.

The depression of the middle web also offers the advantage that a hollow space, which can be filled with a sealant, is formed over it. The above-mentioned side beads can now ensure a front-side limitation of the hollow space and partitioning against the desiccant. In addition, the hollow spaces of the plug-in connector, which are formed due to the trough shape of the webs, may also be filled with a sealant. On the whole, optimal sealing of the connection point of the hollow sections can be achieved due to this measure.

The plug-in connector has a laterally projecting middle stop, with which centering can be achieved in the hollow sections. This middle stop preferably has a reduced wall thickness and as a result, it can dig itself into the front sides of the hollow sections. This eliminates joint gaps or gaps at the connection point of the hollow sections and enables the hollow sections to join one another sealingly.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 10 is an enlarged and cut-away side view of the plug-in connector with a stop and a guide slope as well as an additional fixed stop;

FIG. 11 is a front view of the plug-in connector from FIG. 9;

FIG. 12 is two enlarged and cut-away detail views of the stops with guide slopes;

FIG. 20 is a longitudinal sectional view of a plug-in connector;

FIG. 21 is a cross sectional view of the plug-in connector of FIG. 20;

FIG. 22 is a bottom view of the plug-in connector of FIG. 20;

FIG. 30 is a longitudinal sectional view of a plug-in connector according to another embodiment of the invention;

FIG. 31 is a bottom view of the plug-in connector of FIG. 30;

FIG. 32 is a cross sectional view of the plug-in connector of FIG. 30;

FIG. 33 is detailed sectional view of a portion of the plug-in connector of FIG. 30;

FIG. 34 is detailed top view of the plug-in connector of FIG. 30;

FIG. 53 is a longitudinal sectional view of a plug-in connector according to another embodiment of the invention;

FIG. 54 is a bottom view of the plug-in connector of FIG. 53;

FIG. 55 is a cross sectional view of the plug-in connector of FIG. 54 taken along line A—A of FIG. 54;

FIG. 56 is another cross sectional view of the plug-in connector of FIG. 54 taken along line B—B of FIG. 54;

FIG. 57 is a longitudinal sectional view of a plug-in connector according to another embodiment of the invention;

FIG. 58 is a bottom view of the plug-in connector of FIG. 57;

FIG. 59 is a cross sectional view of the plug-in connector of FIG. 58 taken along line A—A of FIG. 40; and FIG. 60 is another cross sectional view of the plug-in connector of FIG. 58 taken along line B—B of FIG. 58.

DESCRIPTION OF THE PREFERRED EMBODIMENTS

Figure 1:
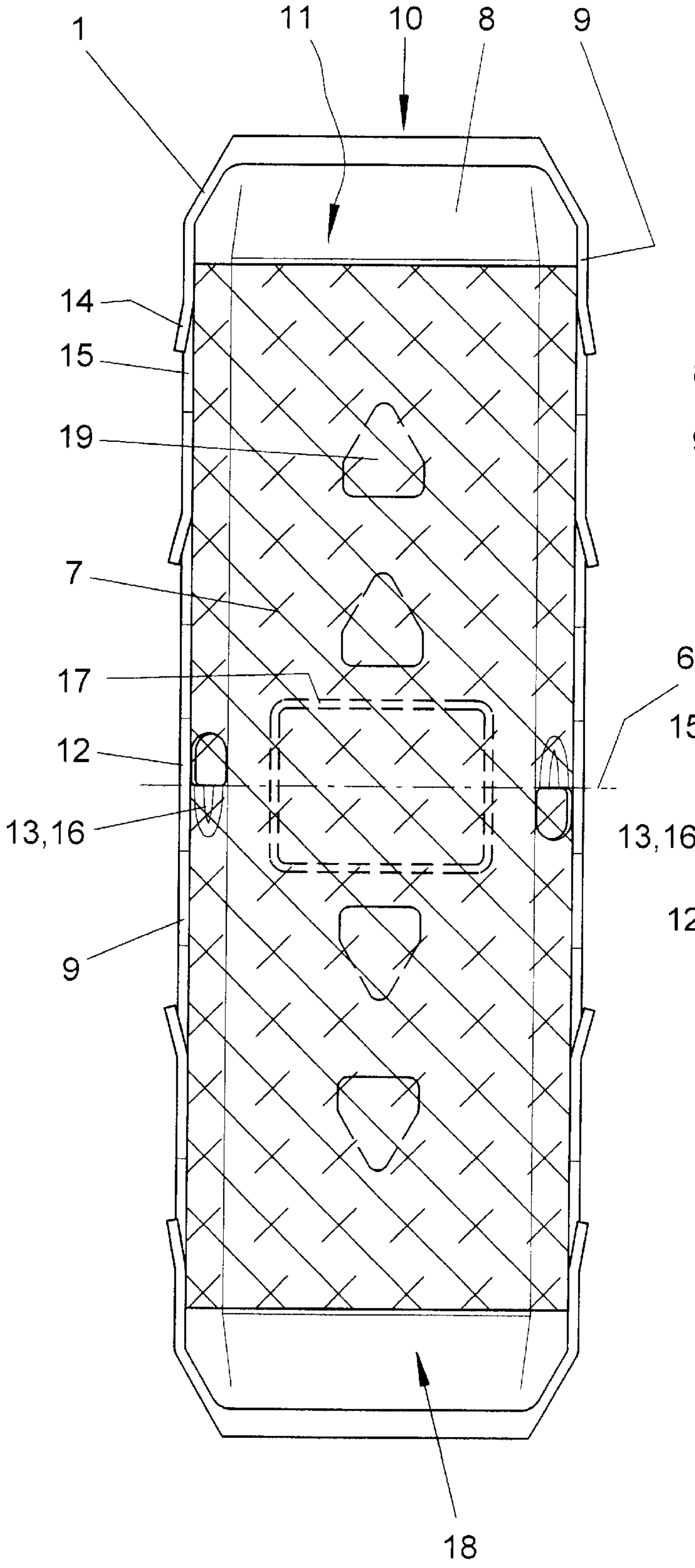
FIG. 1 is a bottom view of a plug-in connector with a pad-like sealing body.

Referring to the drawings, specifically FIGS. 1 through 8, a plug-in connector 1 may be designed as desired as a bent corner connector or as a straight connector. In the preferred embodiment designed as a straight connector, it may likewise have any desired shape.

The plug-in connector 1 is used to connect two hollow sections 2, 3. These may be hollow sections of a spacer frame or of an arrangement of bars between insulating glass panes. The hollow sections 2, 3 preferably consist of metal, e.g., a light metal alloy or even a stainless steel, and the walls of the section can be made especially thin in the second case. The plug-in connector 1 is mounted at the connection or junction point 6 of the hollow sections 2, 3. It is preferably located centrally in both hollow sections 2,3.

In the exemplary embodiment shown, the plug-in connector 1 has an essentially U-shaped cross section. Its wall comprises a middle web 8 and two vertical or oblique side webs 9. The middle web 8 is bent obliquely on the front sides 10 and it likewise forms an essentially closed wall in this area. The webs 8, 9 enclose with one another a hollow space 11, whose opening 18 forms the open U side.

An elastic sealant 7 is arranged in the hollow space 18. FIGS. 1 through 8 show various embodiments and arrangements herefor. A granulated desiccant 20, which is in connection with the interior space between the insulating glass panes via a perforation in the sections, is located in the spacer frame. Granular material 20 is prevented from escaping at the connection point 6 by the closed front sides 10 and additionally by the sealant 7.

In FIGS. 1 through 5, the sealant 7 is arranged as a prefabricated sealing body 7, which is designed, e.g., as a parallelepipedic pad and is fixed on the inside of the middle web 8 by a bonded connection or in any other suitable manner. The sealing body 7 may be adapted to the shape of the hollow space 18 and partially or completely fill out same. The sealing body 7 consists of an elastic material, e.g., a plastic foam. The size of the sealing body 7 is selected to be such that it protrudes somewhat to the outside through the opening 18 of the hollow space and thus projects over the contour of the plug-in connector 1 and over the lower edge of the side webs 9.

Figure 3:
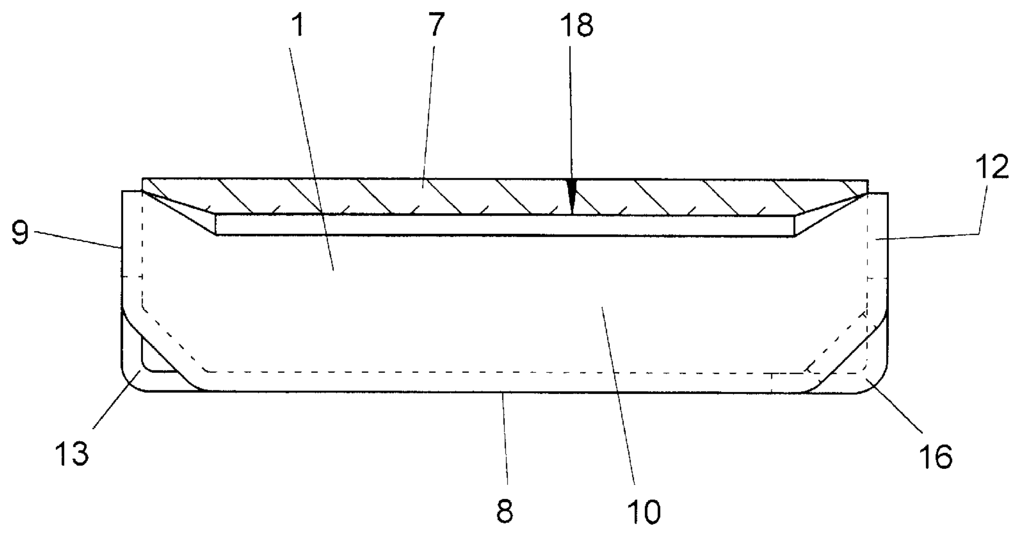
FIG. 3 is a front view of the plug-in connector.
Figure 4:
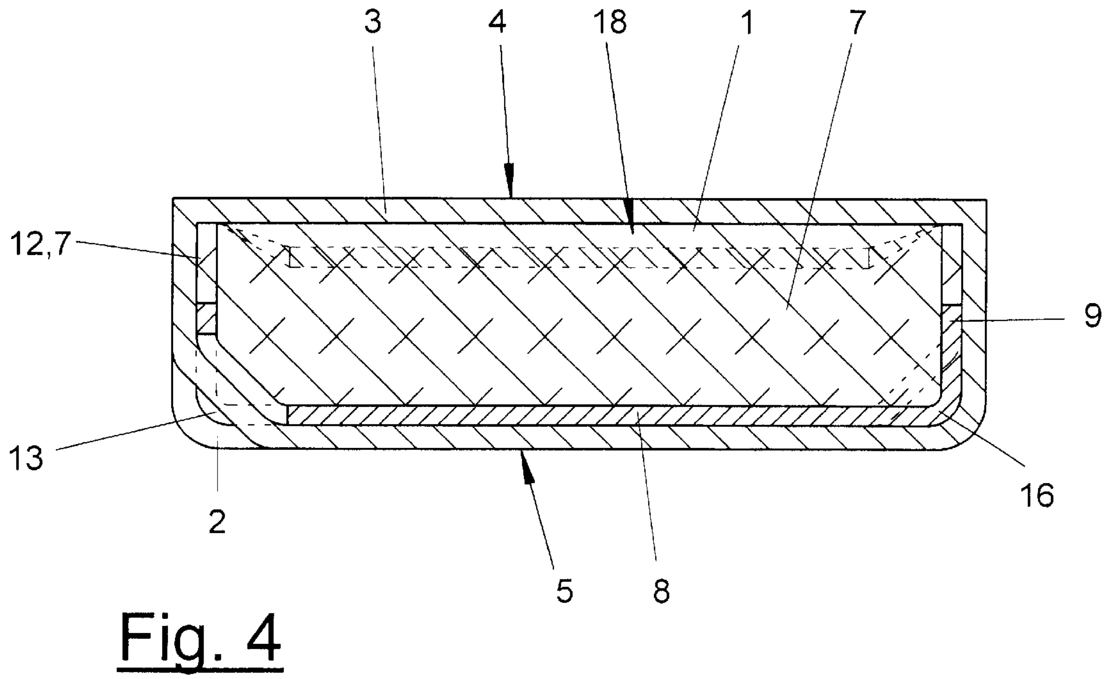
FIG. 4 is a front view of the plug-in connector in the assembled position in the hollow sections.

The sealing body 7 is preferably located at least in the area of the connection point 6, which is preferably identical to its center in the longitudinal direction in the plug-in connector 1 being shown. As is shown in FIGS. 3 and 4, the sealing body 7, which initially still projects over the side webs 9, is compressed in the hollow sections 2, 3 during the assembly of the plug-in connector and as a result, it is in contact with the inner wall of the hollow sections 2, 3 under pressure in the area of the opening 18 of the hollow space. It overlaps the connection point 6 and seals same.

As is shown in FIGS. 3 and 4, the plug-in connector 1 is mounted in the hollow sections 2, 3 such that its middle web 8 points toward the outer roof area 5 of the hollow sections 2, 3. The opening 18 of the hollow space points toward the bottom area 4 of the hollow sections 2, 3. The bottom area 4 is turned toward the interior space between the panes.

To ensure that the plug-in connector 1 will find the center during the assembly of the hollow sections 2, 3, one or more stops of any desired design are present at the plug-in connector 1. In the embodiment shown, stops 13 located opposite one another and arranged at the oblique transition between the middle web 8 and the side web 9 are present at the connection point 6 and at the center of the connector. These are designed as fixed stops and act in one direction. They are arched outward due to a deformation of the wall of the connector. On their front side forming the stop, they drop steeply downward and pass over into a recess 15 located in the front. A guide slope 16 each is present on the rear side. The left-hand stop 13 shown in FIG. 5 acts as a stop for the hollow section 2 pushed on from the top with its front side pointing toward the connection point 6 and forms the guide slope for the other hollow section 3 with its rear side. The right-hand stop 13 has a corresponding design and is arranged rotated. As a result, it acts as a stop for the lower hollow section 3 and as a guide slope 16 for the upper hollow section 2.

Figure 2:
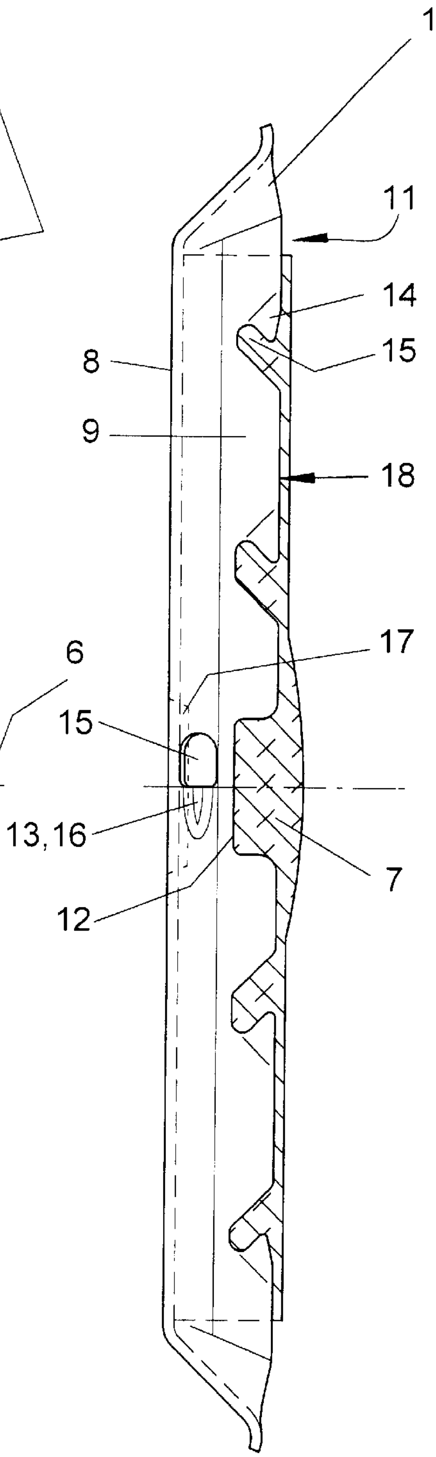
FIG. 2 is a tilted side view of the plug-in connector in FIG. 1.

The plug-in connector 1 has a projection 17, which is directed toward the hollow space 11 and is designed, e.g., as a plate-like boss, at the middle web 8 in the area of the connection point 6. This projection 17 arches the sealing body 7 additionally through the opening 18 of the hollow space to the outside at the connection point 6. FIG. 2 shows this effect. Due to this arching, the sealing body 7 is additionally compressed at the connection point 6 during assembly and it exerts an increased pressing force and sealing action at this critical point.

Figure 5:
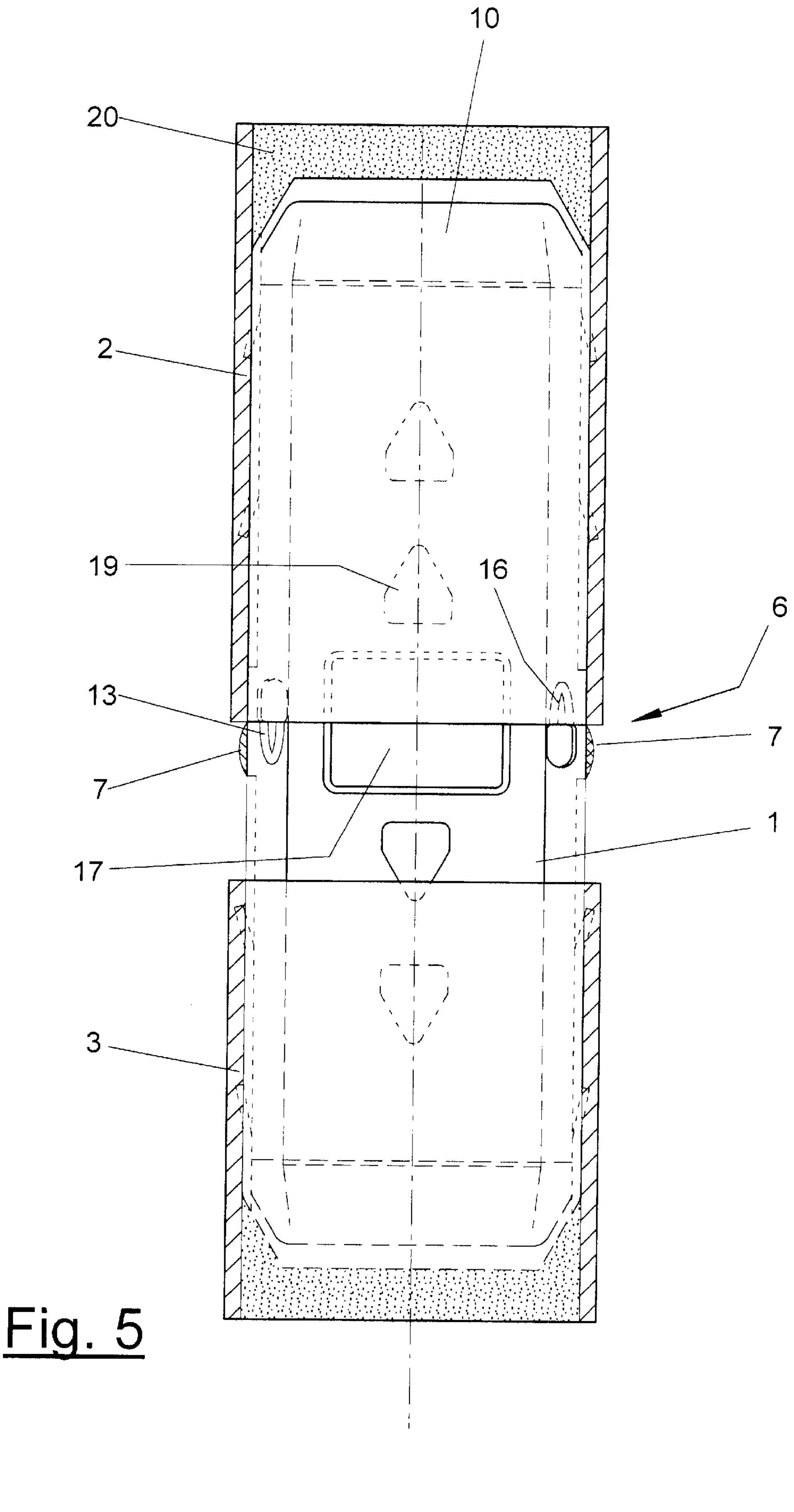
FIG. 5 is a top view of the assembled position of the plug-in connector in FIG. 4.

FIG. 2 also shows that the side webs 9 have a set-back recess 12 at their free edge in the area of the connection point 6. The compressed sealing body 7 can pass through this recess 12 during assembly and come into sealing contact with the side walls of the hollow sections 2, 3. This effect is also shown in FIG. 5.

The sealing body 7 may additionally also exit to the outside through the recesses or cut-outs 5 in the area of the stops 13 and additionally sealingly close these openings and come into sealing contact with the hollow sections 2, 3.

In addition, the plug-in connector 1 may have one or more elastic or frictional retaining elements 14. In the embodiment being shown, these are cut-out retaining bosses 14 bent out to the side, which are bent in the direction of pushing in and cling to one another in the hollow sections 2, 3 during retraction. Recesses or cut-outs 15, through which the sealing body 7 protrudes during assembly, may also be present in the area of the retaining bosses 14.

The plug-in connector 1 may also have other possibilities of fastening. In the embodiment being shown, it has a plurality of caulking openings 19 of a suitable shape at the middle web 8, through which wall caulking is engaged in a positive-locking manner in the roof area 5 of the hollow sections 2, 3 after the assembly. The wall caulking is performed by means of punches applied from the outside, which press the wall of the hollow section through the caulking openings 19 into the hollow space 11 and the sealing body 7. The sealing body 7 can thus sealingly close essentially all openings on the plug-in connector 1 during assembly.

Figure 8:
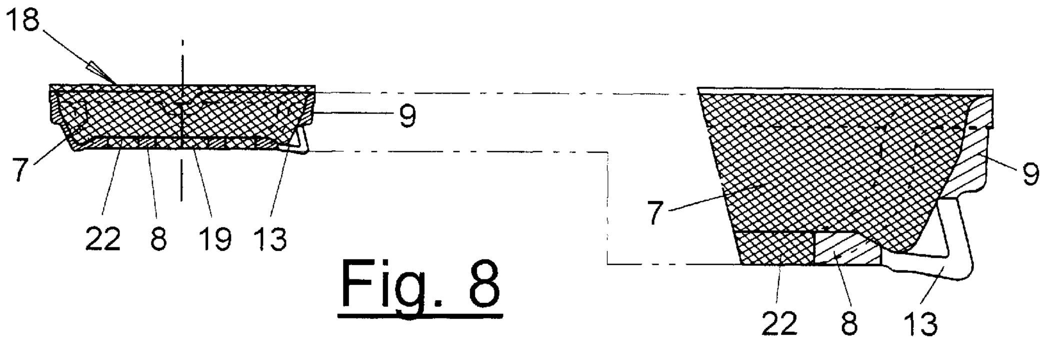
FIG. 8 is a cross sectional view of the plug-in connector in FIG. 6 along the section line VIII—VIII with an enlarged detail of the corner area.
Figure 7:
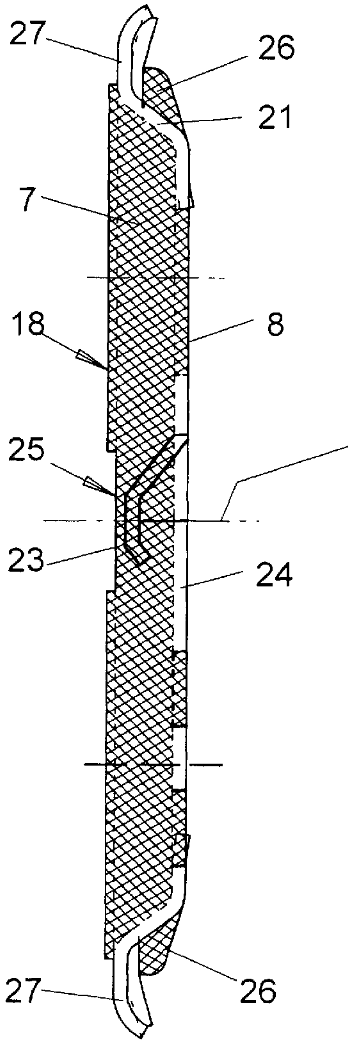
FIG. 7 is a tilted and partially opened side view of the plug-in connector in FIG. 6.
Figure 6:
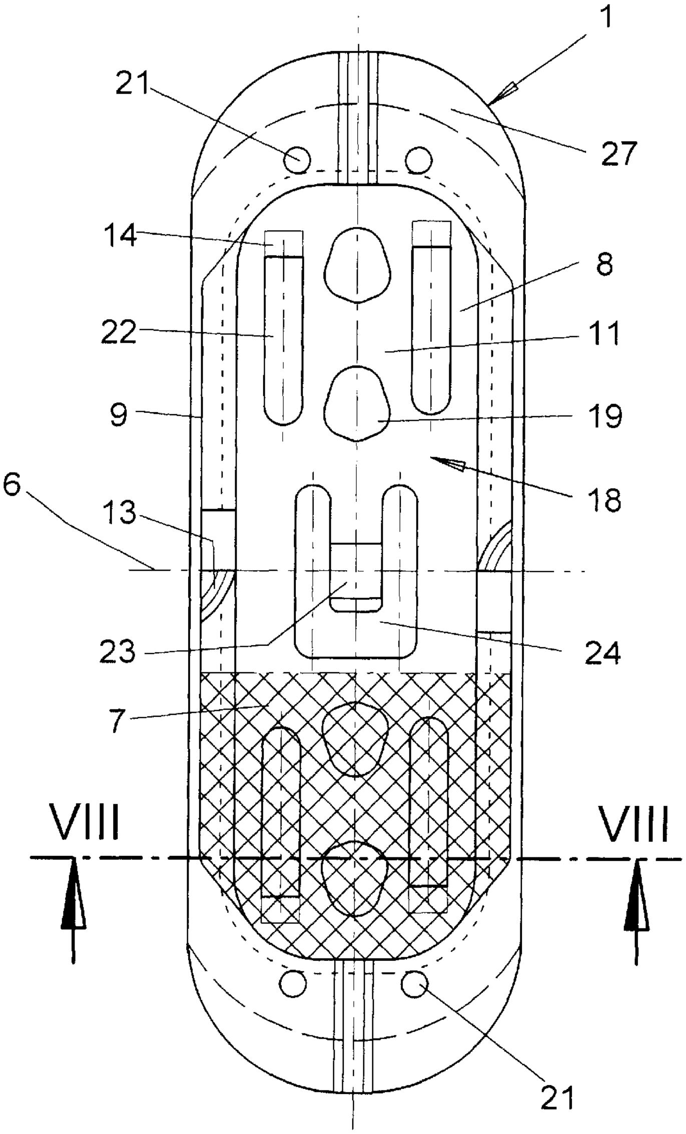
FIG. 6 is a bottom view of a variant of the plug-in connector with a sealing compound shown partially.

FIGS. 6 through 8 show a variant of the plug-in connector 1 and of the sealing body 7. FIG. 6 shows a bottom view of the plug-in connector 1 and a view from the opening 18 of the hollow space. The sealant 7 is shown here only partially for clarity's sake.

The plug-in connector 1 again has an essentially U-shaped cross section, and the side webs 9 located on the two front sides are bent off axially and form a broadened web edge 27. This broadened web edge 27 has the function of a foot surface, which additionally comes into sealing contact with the wall of the hollow section pointing toward the inside of the pane during assembly. In addition, the broadened web edge 27 is bent up at the front end. It straightens any possible deformation on the front side of the hollow sections 2, 3 during pushing into the hollow sections 2, 3.

In the embodiment shown, the axially extending side webs 9 have only a slightly outwardly directed bend at the lower edge. In a variant, not shown, these side webs 9 may also form a lateral bend and a broadened foot surface at the end.

The plug-in connector 1 shown in FIGS. 6 through 8 has a hollow space, which extends over the connection point 6. In another variant, not shown, the plug-in connector 1 may have a camel hump-like longitudinal section with two hollow spaces, corresponding to DE-G 297 19 208.

In addition, the plug-in connector 1 according to FIGS. 6 through 8 has one or more front-side wall openings 21 on the front-side side webs 9, which are significant for the sealant 7 to be explained below. In addition, an axially extending, central arch, which overlaps the perforation of the hollow sections 2, 3, may be present on the broadened web edges 27. The stops 13 in the area of the connection point 6 are the same as in the above-described exemplary embodiment according to FIGS. 1 through 5.

Besides the caulking openings 19, the middle web 8 may have additional, longitudinally directed axial wall openings 22 arranged on both sides of the connection point 6. These may have an outwardly bent retaining element 14 at their respective rear ends. The wall openings 22 are used as shot-through openings for clips for fastening bar sections to the spacer frame. The clips are shot through the hollow sections 2, 3 and the middle web 8 into the bar sections or their end-side closing plug.

In addition, a tongue, which is bent off into the hollow space 11 and acts as a sealant holder 23 for the sealant 7 to be explained below, is located in the middle area of the middle web 8. A recess 24 or a cut-out is present on the middle web 8 all around the sealant holder 23.

In the embodiment shown in FIGS. 6 though 8, the sealant 7 consists of an initially liquid or pasty sealing compound, which is injected into the hollow space 11 or is filled in or introduced in another manner. The sealing compound 7 binds and solidifies somewhat, while maintaining its elasticity. The sealing compound 7 exits through the wall openings 21 on the front side and forms a positive-locking anchor via foam beads 26. In addition, the sealing compound 7 surrounds the sealant holder 23 in a positive-locking manner. As a result, the sealing compound 7 is anchored and held in a positive-locking manner in the hollow space 11.

As in the above-described exemplary embodiment, the sealing compound 7 protrudes through the opening 18 of the hollow space and somewhat projects over the contour of the connector in the bottom area of the plug-in connector 1. FIG. 7 shows this projection. In addition, the liquid or pasty sealing compound 7 also protrudes to the outside through the other recesses or openings 15, 19, 22, 24 at the middle web 8 and seals same. A certain projection may be present here as well.

In the area of the connection point 6, the sealing compound 7 in the exemplary embodiment shown has a set-back recess 25, which jumps back somewhat to the level of the lower edge of the side webs 9. The recess 25 extends somewhat axially beyond the connection point 6 on both sides. The sealant holder 23 bent off at the lower end can also extend up to the level of the lower wide web edge with its essentially axially directed foot surface or it may even end somewhat over it. Through the recess 25, the elastic sealing compound 7 is sealingly in contact with the walls of the hollow sections especially in the areas located in front or and behind the connection point 6. Large sealing surfaces are available for this. On the other hand, the recess 25 prevents particles of the sealing compound from being rubbed off or scraped off during the pushing on of the hollow sections 2, 3 in the area of the connection point 6, from escaping through the gap initially present at the connection point 6 and from entering the interior space between the panes.

The liquid or pasty sealing compound 7 may be introduced into the plug-in connector 1 before the mounting of the plug-in connector 1 in the hollow sections 2, 3. The plug-in connector 1 will then form a prepared component together with the sealing compound 7. As an alternative, the sealing compound 7 may also be introduced during the assembly.

In the embodiment shown, the plug-in connector 1 is preferably a punched and bent part consisting of metal, especially sheet steel. As an alternative, it may also consist of a plastic or any other material.

Any modification of the embodiment shown is possible. The plug-in connector 101 may have a plurality of hollow spaces 132, which are optionally all filled at least partially with a sealing body 128 of a corresponding shape. Furthermore, the plug-in connector 101 may have any cross-sectional shape. It may have, e.g., an I shape or a double T shape. Furthermore, an additional sealant may also be arranged on the outside in the area of the projection 17. The sealing body 128 may have a shortened shape, which essentially covers the connection point 6 and a certain safety margin on both sides. In addition, the sealing body 7 may be designed with a lateral oversize, so that it protrudes through the recesses 12, 15 already at the time of fastening in the plug-in connector 1. However, as in the embodiment shown as well, it may be fitted exactly between the side webs 9 or it may be even smaller. In addition, the design and the arrangement of the stops 13 and of the retaining elements 14, 19 are variable. The plug-in connector 1 could also be open on the front sides 10.

Figure 13:
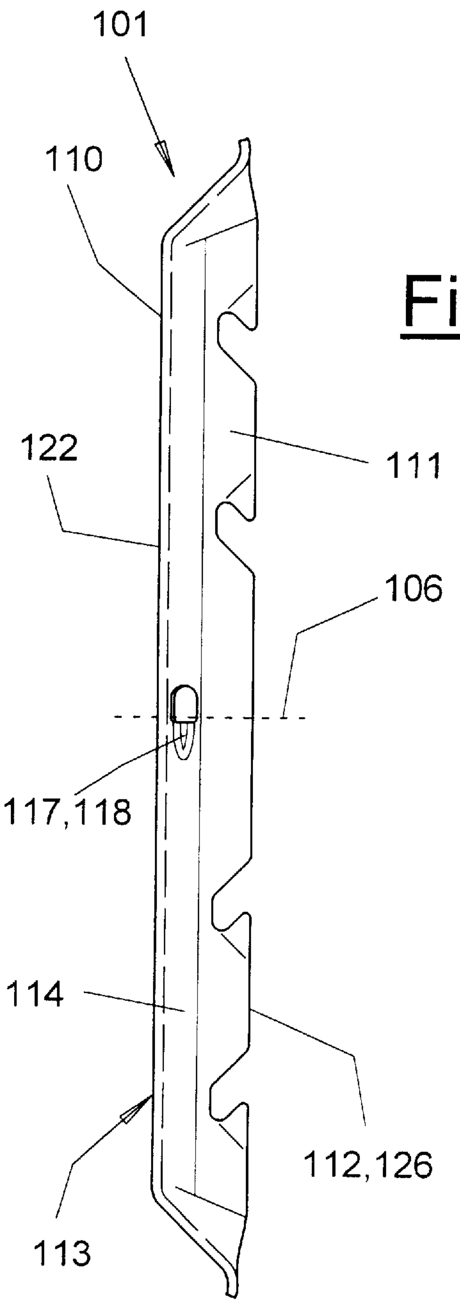
FIG. 13 is a variant of FIG. 1 with stops and a straight web edge.
Figure 14:
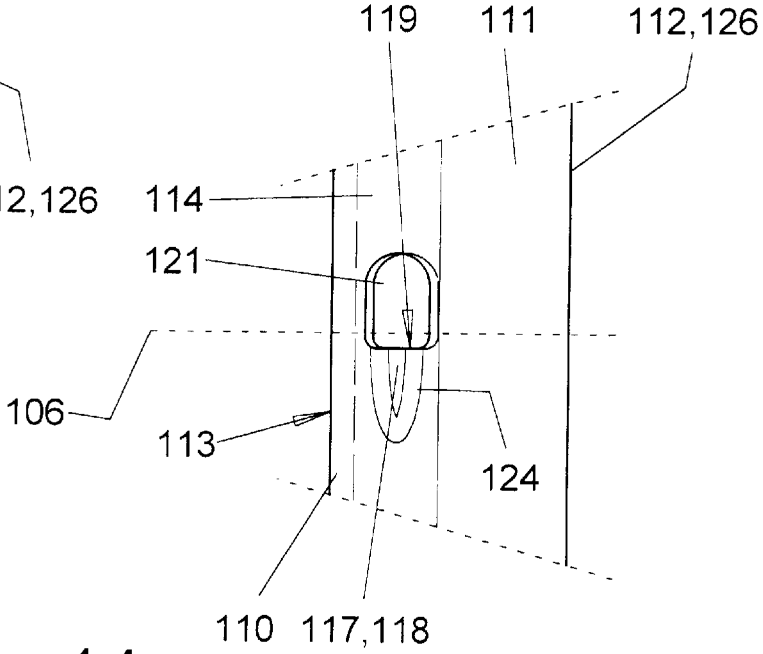
FIG. 14 is a cut-away and enlarged detail from FIG. 13.
Figure 15:
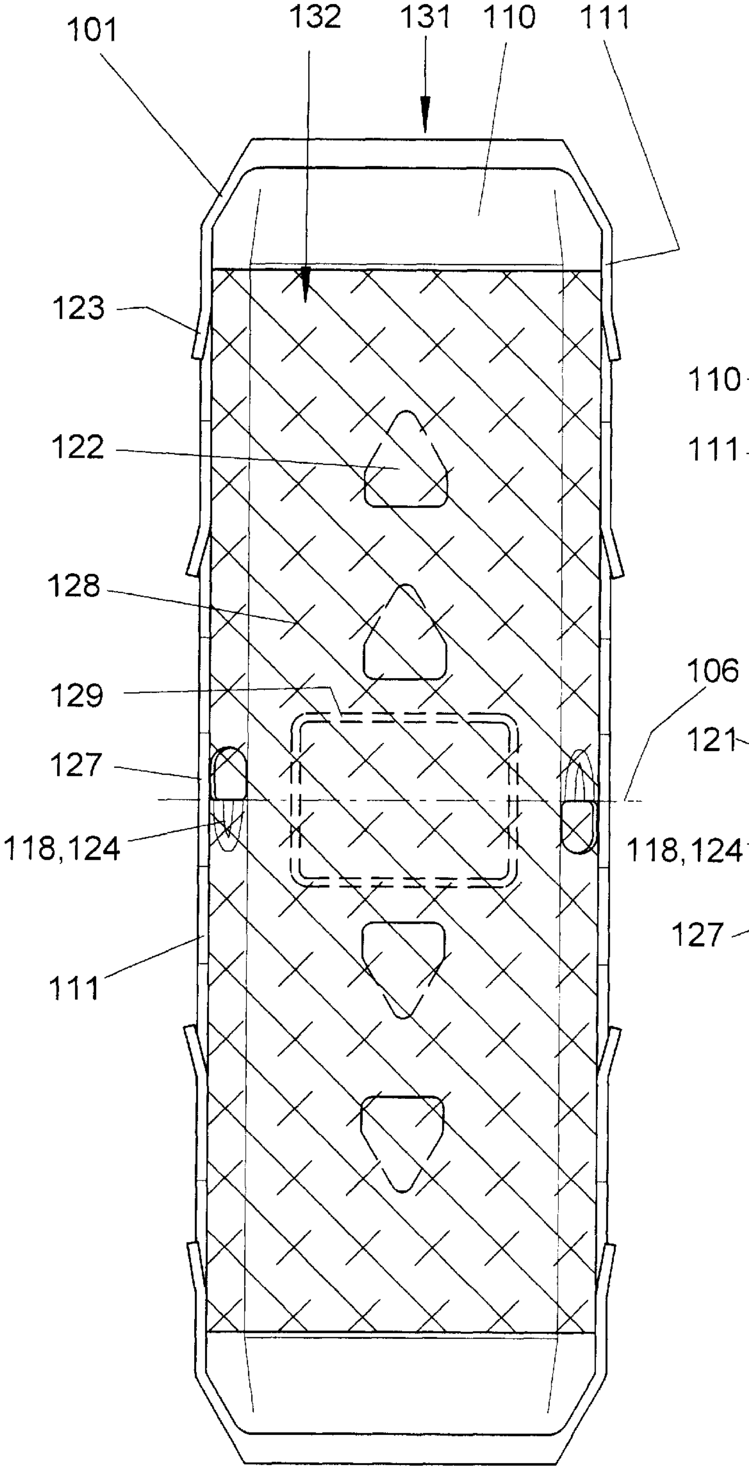
FIG. 15 is a bottom view of a plug-in connector with a sealing body.

Now specifically referring to FIGS. 9 through 19 a plug-in connector 101 in the form of a straight connector is intended for hollow sections 102, 103 of spacers for insulating glass panes. FIGS. 13 through 15 show the plug-in connector 101 in conjunction with such hollow sections 102, 103. As an alternative, there may also be other hollow sections, e.g., bars for insulating glass panes.

The spacer formed by the hollow sections 102, 103 shown is used to space two individual panes of an insulating glass pane not shown. The hollow sections 102, 103 shown are preferably especially thin-walled and consist of stainless steel. They have a markedly reduced thermal conduction coefficient compared with the thicker-walled hollow sections made of light metal, especially aluminum or aluminum alloys, which were hitherto used, and they are especially suitable for higher-quality heat-insulating glazing. Such hollow sections 102, 103 have a wall thickness of, e.g., about 0.2 mm.

Figure 18:
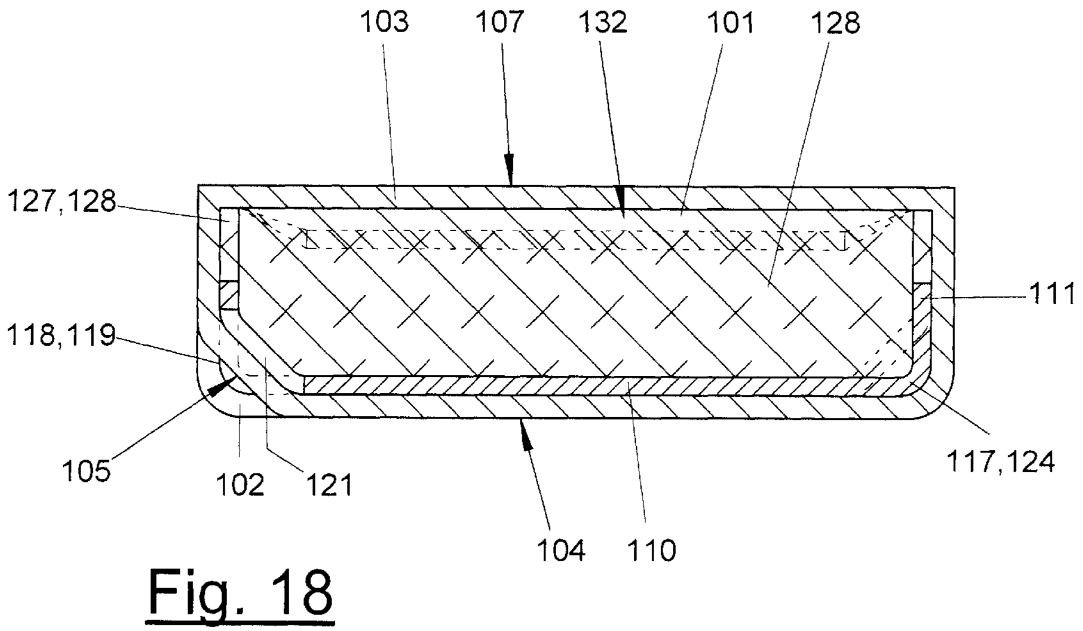
FIG. 18 is a front view of the plug-in connector in the assembly position in the hollow sections.

The hollow sections 102, 103 have an essentially rectangular cross-sectional shape in the exemplary embodiment shown. A bevel or rounding may be present in the corner area 105, as shown in FIG. 18, between the roof area 104 pointing toward the outside at the spacer frame and the side walls. The opposite bottom of the section lies on the inside 107 of the spacer frame and points toward the interior space of the panes. Sharper corners may be present between the bottom and the side walls of the hollow sections 102, 103. The side walls may optionally also continue in longitudinally extending webs beyond the bottom. However, the cross-sectional shape of the hollow sections 102, 103 shown may also be varied in any desired manner and may have a design other than that shown.

The cross-sectional shape of the plug-in connector 101 is adapted to the shape of the hollow sections 102, 103. In the exemplary embodiment shown, the plug-in connector 101 has a U-shaped cross section with a middle web 110 and two side webs 111 located at spaced locations therefrom. The middle web 110 points toward the roof area 104. An oblique or round transition 114 may be present between the middle web 110 and the side webs 111. Deviating from the exemplary embodiment being shown, the plug-in connector 101 may also have a box-like, closed cross section. In addition, its shape may also be varied in another way for adaptation to the shape of the hollow section.

The plug-in connector 101 shown preferably consists of metal. However, it may also consist of a plastic or any other suitable material as well as composites. It is made as a punched and bent part from sheet steel in the exemplary embodiment being shown. It preferably consists of a strip of steel, which is quenched and tempered and galvanized after punching and bending.

The plug-in connector 101 has a middle stop at the connection point or junction point 106, which is preferably also the transversely extending center line of the plug-in connector 101 at the same time. The middle stop consists of at least two stops 117, 118, against which at least the front wall of the first pushed-on hollow section 102, 103 abuts. According to FIGS. 9 through 13, fixed stops 115, 116 may be additionally present. The plug-in connector 101 passes halfway through the middle stop into the hollow sections 102, 103. It makes it possible to push the hollow sections 102, 103 sealingly against one another at the connection point 106 and it extensively prevents gaps from being formed in this area. This improves the optical appearance of the spacer, on the one hand, and, on the other hand, it prevents the granulated desiccant located on the inside from escaping at the connection point 106 and from entering the interior space between the panes.

As is illustrated in FIGS. 11, 12, 17 and 18, the stops 117, 118 are arranged at the above-mentioned oblique transition 114 between the middle web and the side web 110, 111. As a result, the stops 117, 118 point obliquely to the outside and preferably have an outwardly arched, round, convex cross-sectional shape 125. They are punched out and caulked.

Figure 19:
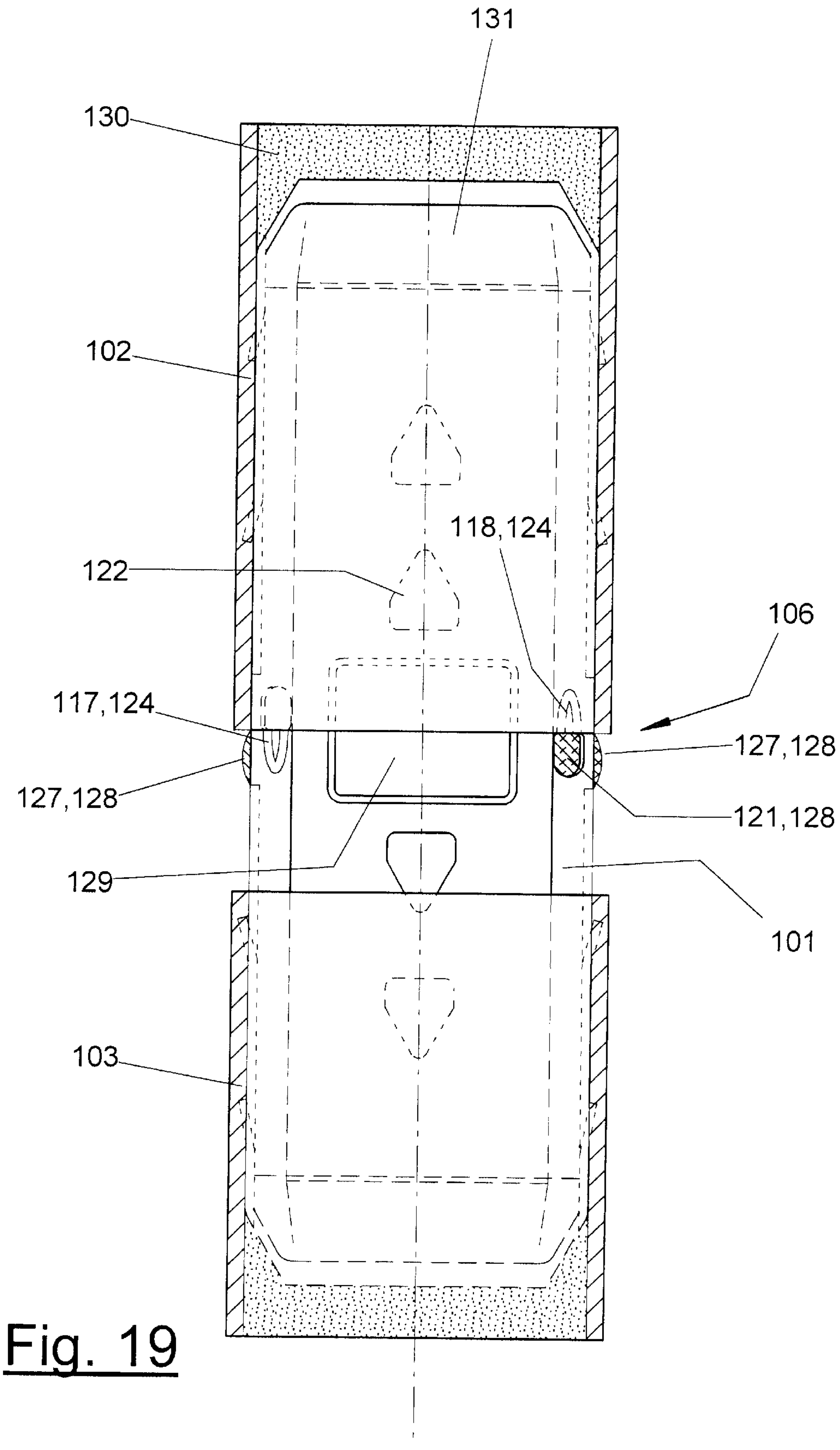
FIG. 19 is a top view of the assembly position of the plug-in connector.
Figure 23:
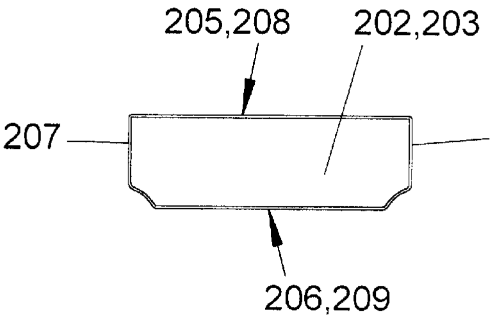
FIG. 23 is an end view of a hollow section.
Figure 26:
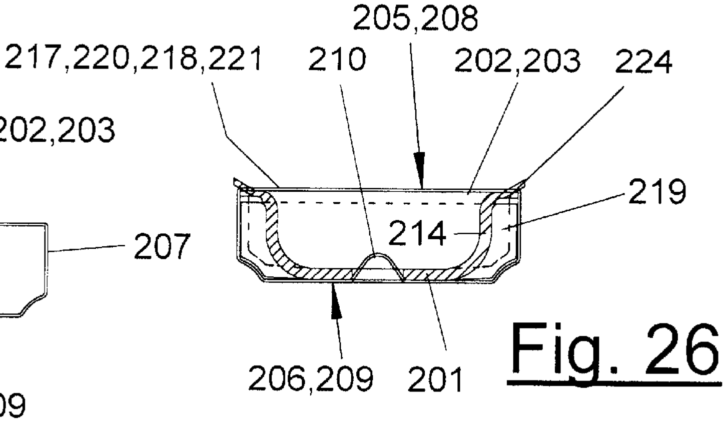
FIG. 26 is a cross sectional view of the plug-in connector of FIG. 20 in the fitting position in two hollow sections.

The stops 117, 118 are preferably designed as fixed stops directed against one another and acting in one direction. They point in opposite directions, with each stop 117, 118 acting on only one hollow section 102, 103. As is illustrated in FIG. 19, the hollow section 102 is in contact with the stop 117 and the hollow section 103 is in contact with the stop 118. The stops 117, 118 are cut off straight for this purpose at the front end pointing toward the connection point 106 at right angles to the longitudinal axis of the connector and form a stop edge 119 as a result. The stops 117, 118 are axially offset in relation to one another in the area of the connection point 106 and are located opposite one another at the connection point 106. They may be set back from the connection point 106 by a small amount.

On their rear side, the stops 117, 118 have a guide slope 124, which rises in a wedge-shaped pattern from the stop side of the transition 114 toward the stop edge 119 and to the connection point 106. A punched-out opening 121 each is located in front of the stop edges 119 of the stops 117, 118. The opening 121 facilitates the caulking and is advantageous for the formation of a straight stop edge 119.

Figure 17:
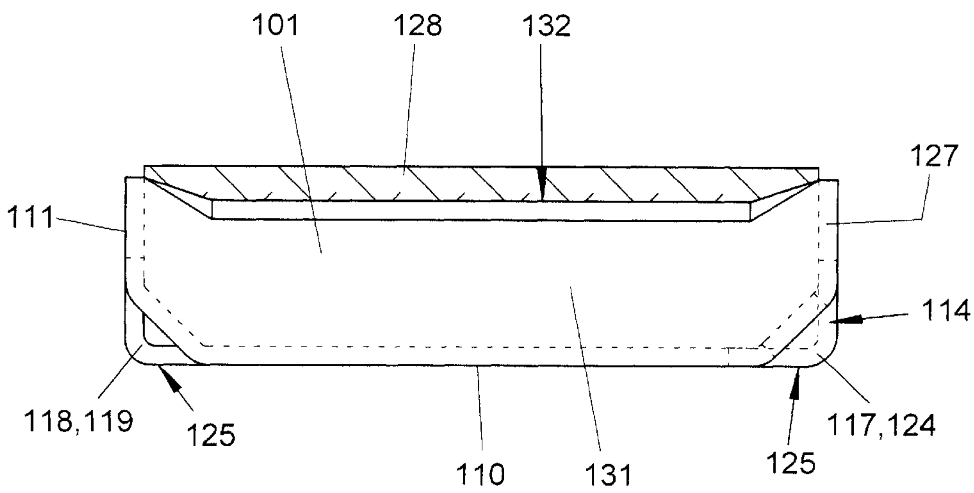
FIG. 17 is a front view of the plug-in connector from FIG. 16.

The arches 125 of the stops 117, 118 or of their guide slopes 124 may be designed as small bumps, which are narrower than the transition 114. FIGS. 11 and 12 show such a design. In another variant, as it is shown in FIGS. 17 and 18, the arches 125 are larger and pass over with their lateral edges into the middle web 110 and the adjoining side web 111.

The additional fixed stops 115, 116 are arranged at an edge 112 of the side webs 111. This is preferably the lower web edge pointing toward the interior 107 of the frame. The fixed stops 115, 116 act in one direction only, and these directions of action are opposite. The fixed stops 115, 116 are axially offset in relation to one another in the area of the connection point 106 and are located opposite one another at the connection point 106. One fixed stop 115, the right-hand one, cooperates with the hollow section 102 and the other fixed stop 116 cooperates with the hollow section 103.

As is shown in FIG. 10, the fixed stops 115, 116 preferably have the shape of essentially triangular stops bosses and have, on the front side pointing toward the connection point 106, a straight stop edge 119, which extends essentially at right angles to the longitudinal axis of the connector. The stop edge 119 may end in a small punched-out opening. On the rear side, the stop bosses 115, 116 have an oblique flank 120, which rises from the web edge 112. The hollow section 102, 103 are pushed and slid on the oblique flank 120 from the rear side. The shape may correspond to that shown in DE-G 94 11 067.

In the exemplary embodiment being shown, the stop bosses 115, 116 project from the lower wedge edge 112 and are located in the extension of the side webs 111. As an alternative, the fixed stops 115, 116 may also project obliquely or laterally and laterally project over the lateral surface of the webs 111 as a result.

The stops 117, 118 are arranged at the other edge area 113 of the side webs 111. The stop 117 is located over the fixed stop 115 and the other stop 118 is located over the fixed stop 116. As is shown in FIG. 10, the fixed stops 115, 116 and their stops 117, 118, which are associated with the same side web 111, are arranged opposite one another at the connection point 106. The fixed stops 115, 116 are located on one side of the connection point 106 and the stops 117, 118 are located on the opposite side.

Figure 9:
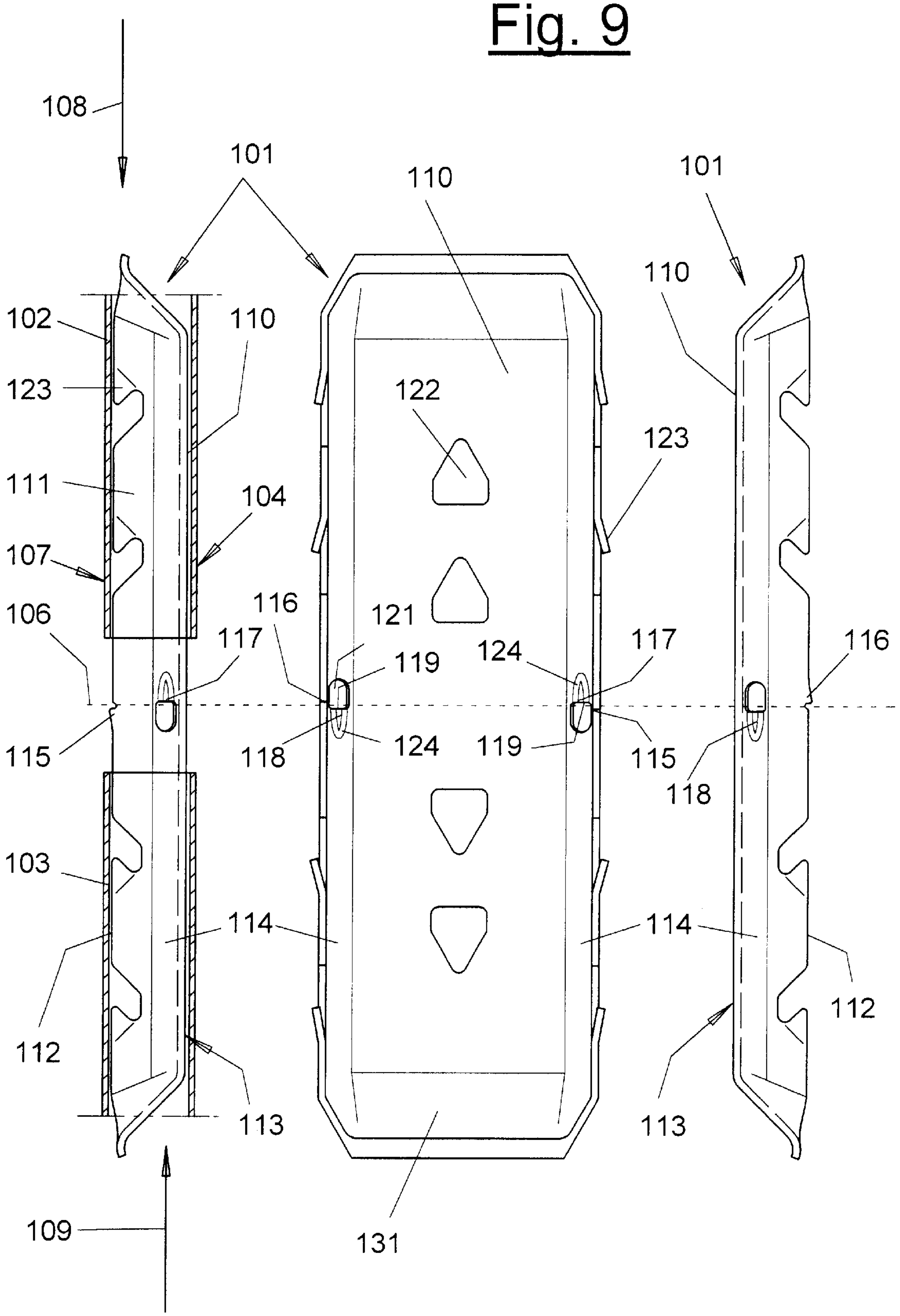
FIG. 9 is a bottom view of a plug-in connector and two tilted side views.

As is shown in FIGS. 9 and 10, the stop edges 119 of the fixed stops 115, 116 and stops 117, 118 located at the same side web 111 point in opposite directions. As is shown in the exemplary embodiment, the stop edges 119 may be arranged somewhat set back axially in relation to the connection point 106 or center line. As an alternative, they may, however, also be located at the same level.

The fixed stops 115, 116 and stops 117, 118 directed in the same direction as well as their guide slopes 124 cooperates in terms of their stop function. This means that the fixed stop 115 cooperates with the stop 118 located at the other side web 111 and the fixed stop 116 cooperates with the likewise diagonally opposite stop 117. These stops 115, 118 and 116, 117, which cooperate in terms of their stop function, are located at the same level with their stop edges 119 when viewed axially. As a result, the pushed-on hollow sections 102, 103 abut against two front wall corners located diagonally opposite one another over the cross section of the section.

As is illustrated in the representation on the left-hand side of FIG. 9, the hollow section 102 is first pushed onto the plug-in connector 101 in direction 108. It now slides on the guide slope 124 of the stop 117 and its oblique flank in the outer corner area 105. At the diagonally opposite corner, the hollow section 2 slides on the rear flank 120 of the fixed stop 116 not visible. In the area of the connection point or center line 106, the section 102 abuts against the fixed stop 115 in the bottom area and against the stop 118 in the diagonally opposite corner area 105.

The previous sliding up of the hollow section 102 on the guide slope 124 of the stop 117 causes the hollow section 102 to be raised and to be pressed with the bottom against the lower web edge 112. As a result, the front wall of the hollow section comes reliably into contact with the stop edges 119 of the stop 118 and of the fixed stop 115.

As is shown in FIG. 10, the fixed stops 115, 116 project to the outside from the associated web edges 112 by a small amount only. This projection is approximately as great as the wall thickness of the section and equals about 0.2 mm in the exemplary embodiment being shown. The elevation of the guide slopes may be substantially greater. In the exemplary embodiment being shown, it is about 0.5 mm to 1 mm e.,g., at the vertex and at the stop edge 119.

The second hollow section 103 pushed on subsequently abuts against the front side of the first hollow section 102 or against the corresponding stops 116, 117 of the plug-in connector 101. If the stops 115, 116 and 117, 118 are arranged set back axially in relation to the connection point 106, it abuts against the hollow section 102 pushed on previously.

FIGS. 13 and 14 show a variant of the plug-in connector 101 from FIGS. 9 through 12. The design and the arrangement of the stops 117, 118 and their guide slopes 124 are the same in both embodiments. In addition, the effect of stabilizing the corner area 105 of the hollow sections 102, 103, on the one hand, and the reliable abutment against the stop edges 119 of the stops 117, 118, on the other hand, which are achieved as a result, are thus given and achieved. As a variation to the above-described exemplary embodiment, the fixed stops 115, 116 are omitted in FIGS. 13 and 14. The lower web edge 112 has, instead, a continuous edge 126, which is straight at least in the area of the connection point 106. The plug-in connector 101 is supported with this edge 126 on the bottom 107 of the hollow sections 102, 103. The support function is particularly good due to the straight, continuous edge. As a result, the stops 117, 118 located at the transition 114 with their guide slopes 124 can stabilize and align the hollow sections 102, 103 especially well.

One or more retaining elements 122, 123, which may have different designs, ensure the secure holding of the plug-in connector 101 in the pushed-on hollow sections 102, 103. Punched-out spring bosses 123, bent out downward and laterally, are arranged at the lower web edges 112 of the side webs 111 in the exemplary embodiment being shown. These spring bosses may already be sufficient in themselves. In addition or as an alternative, a plurality of openings 122, which are engaged by caulking on the roof area 104 of the hollow sections 102, 103 and form a positive-locking connection, may also be present on the middle web 110 pointing toward the outside of the frame. This design corresponds, e.g., to that described in DE-A-43 35 039. As an alternative or in addition, exposed spring bosses may also be present at the middle web 110. The plug-in connector 101 may be closed or open on the front sides. It may also have and desired shape and design other than that shown in the exemplary embodiment being shown.

FIGS. 15 through 19 show another variant of the plug-in connector 101. In the exemplary embodiment being shown, the plug-in connector 101 likewise has an essentially U-shaped cross section. Its wall comprises a middle web 110 and two vertical or oblique side webs 111. The middle web 110 is bent obliquely on the front sides 131 and it likewise forms an essentially closed wall in this area. The webs 110, 111 enclose with one another a hollow space 132, which is open on one side with its opening in the hollow space.

A sealing body 128, which is designed, e.g., as a parallelepipedic pad and is fixed on the inside of the middle web 110 by a bonded connection or in another suitable manner, is arranged in the hollow space 132. The sealing body 128 may be adapted to the shape of the hollow space 132 and may completely fill same. The sealing body 128 consists of an elastic material, e.g., a plastic foam. The sealing body 128 is selected to be so large that it protrudes somewhat to the outside through the opening 132 of the hollow space and thus it projects over the contour of the plug-in connector 101 and over the lower edge of the side webs 111.

The sealing body 128 is located at least in the area of the connection point 106, which is preferably identical to its center in the longitudinal direction in the plug-in connector being shown. As is shown in FIGS. 17 and 18, the sealing body 128, which was initially still projecting over the side webs 111, is compressed during the mounting of the plug-in connector in the hollow sections 102, 103 and is as a result in contact with the inner wall of the hollow sections 102, 103 under pressure in the area of the opening 132 of the hollow space. It extends over the connection point 106 and seals same.

A granular desiccant 130, which is in connection with the interior space of the insulating glass pane via a perforation in the sections, is located in the spacer frames. This granular material 130 is prevented from escaping at the connection point 106 by the closed front sides 131 and additionally by the sealing pad 128.

As is illustrated in FIGS. 17 and 18, the plug-in connector 101 is mounted in the hollow sections 102, 103 such that its middle web 110 points toward the outer roof area 104 of the hollow sections 102, 103. The opening 132 of the hollow space points toward the bottom area 107 of the hollow sections 102, 103. The bottom area 107 is turned toward the interior space between the panes.

To ensure that the plug-in connector 101 will find the center during assembly, at least the above-described stops 117, 118 and optionally additional stops of any desired design are present. The right-hand stop 117 shown in FIG. 18 acts with its front side or stop edge 119 pointing toward the connection point 106 as a stop for the hollow section 102 pushed on from the rear in the plane of the drawing and forms with its rear side the slide-on slope 124 for the other, front hollow section 103 shown in a cut-away representation. The left-hand stop 118 has a corresponding design and is arranged rotated. As a result, it acts as a stop for the hollow section 103 and as a slide-on slope 124 for the hollow section 102.

Figure 16:
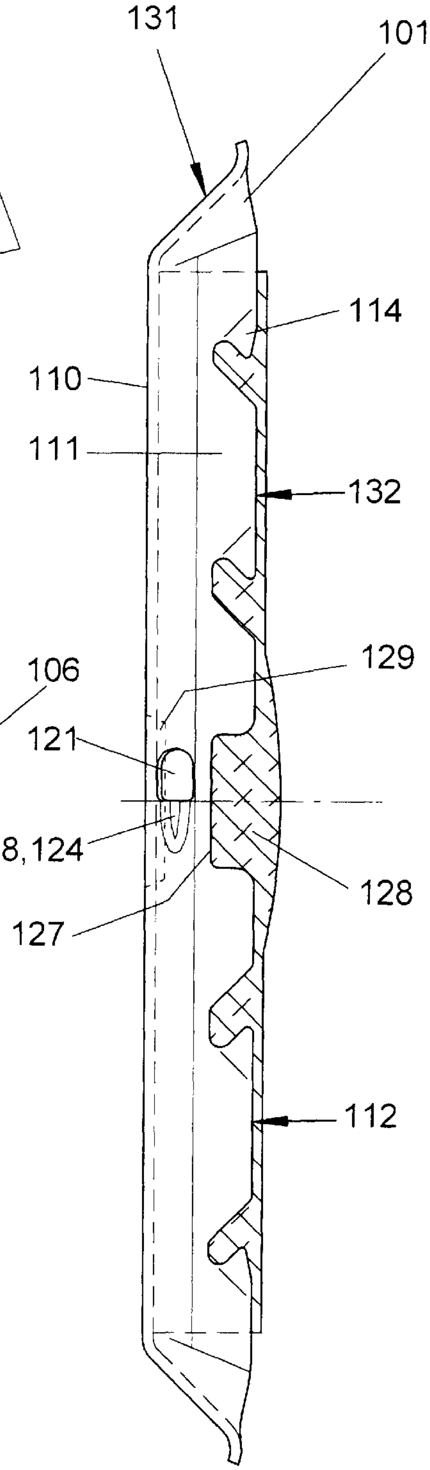
FIG. 16 is a tilted side view of the plug-in connector from FIG. 15.

The plug-in connector 101 has a projection 129 directed toward the hollow space 132, which is designed, e.g., as a plate-shaped embossing, at the middle web 110 in the area of the connection point 106. This projection 129 additionally arches the sealing body 128 to the outside through the opening 132 of the hollow space at the connection point 106. FIG. 16 shows this effect. The sealing body 128 is additionally compressed by this arching at the connection point 106 during assembly and exerts an increased pressing force and sealing effect at this critical point.

FIG. 16 also shows that the side webs 111 have a set-back recess 127 at their free edge 112 in the area of the connection point 106. The compressed sealing body 128 can pass through this opening 127 during assembly and come into sealing contact with the side walls of the hollow sections 102, 103. FIG. 18 also shows this effect.

The sealing body 128 can additionally also exit to the outside through the openings or cut-outs 121 in the area of the stops 117, 118 and additionally sealingly close these openings and come into sealing contact with the hollow sections 102, 103.

Moreover, the plug-in connector 101 may have one or more elastic or frictional retaining elements 123. In the exemplary embodiment being shown, these are retaining bosses 123, which are cut out and bent out to the side, are bent off in the direction of entry and cling to one another in the hollow sections 102, 103 during retraction. Openings or cut-outs 121, through which the sealing body 128 protrudes during assembly, may be present in the area of the retaining bosses 123 as well.

Futhermore, the plug-in connector 101 may also have other possibilities of fastening. In the embodiment being shown, it has a plurality of the above-described caulking openings 122 of a suitable shape at the middle web 110. Through these openings 122, caulking of the wall in the roof area 104 of the hollow sections 102, 103 extends in a positive-locking manner after the assembly. The wall caulking is performed by means of punches applied from the outside, which press the wall of the hollow section through the caulking openings 122 into the hollow space 132 and the sealing body 128. The sealing body 128 can thus sealingly close essentially all openings on the plug-in connector 101 during the assembly.

Various modifications of the exemplary embodiments shown are possible. On the one hand, the fixed stops 115, 116 may have a different shape, position and orientation. Likewise, the wedge-shaped guide slopes 124 and the stops 117, 118 may be made in one piece with or attached to the plug-in connector 101. Additional stops may be present in the area of the middle web 110, and these stops can, e.g., straighten and correct wall deformations of the hollow sections 102, 103, which deformations are also present in this area. For example, spring bosses arranged close to the connection point 106 are also suitable for this purpose. In addition, the plug-in connector 101 may have a closed cross section with two middle webs, in which case spring bosses, stops and the like may be correspondingly arranged on the second middle web as well.

The plug-in connector 101 may also have a plurality of hollow spaces 132, which may optionally all be filled at least partially with a sealing body 128 of a corresponding shape. Furthermore, the shape of the cross section of the plug-in connector 101 may be varied as desired. Furthermore, an additional sealing body may also be arranged on the outside in the area of the projection 129. The sealing body 128 may have a shortened shape, which covers essentially the connection point 106 and a certain safety margin on both sides. Moreover, the sealing body 128 may be designed with a lateral oversize, so that it passes through the openings 127, 121 already at the time of fastening in the plug-in connector 101. However, just as in the embodiment shown, it can also be fitted exactly between the side webs 111 or it may be even narrower. In addition, the design and the arrangement of the stops 117, 118 and of the retaining elements 123, 122 are also variable. The plug-in connector 101 could also be open on the front sides 131.

Figure 24:
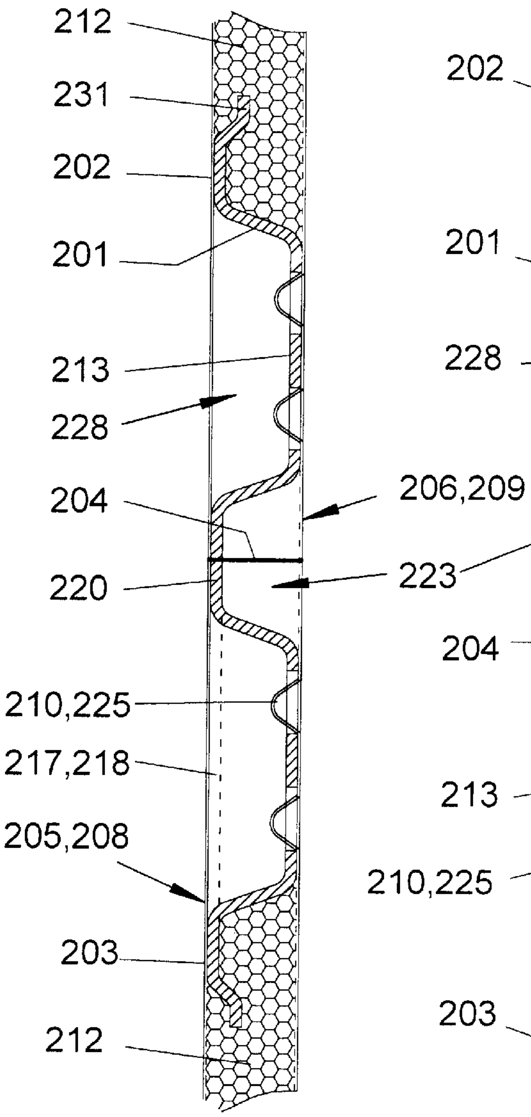
FIG. 24 is a longitudinal sectional view of a plug-in connector of FIG. 20 in the fitting position in two hollow sections.
Figure 25:
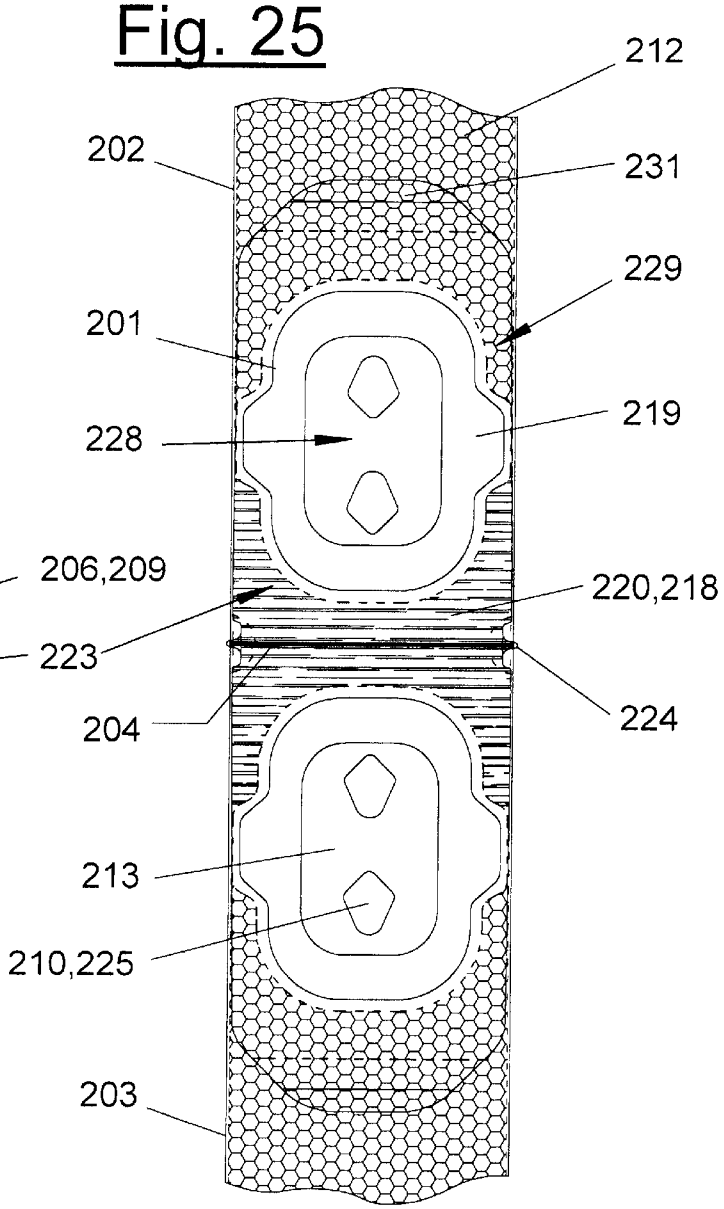
FIG. 25 is a bottom view of the plug-in connector of FIG. 20 in the fitting position in two hollow sections.
Figure 27:
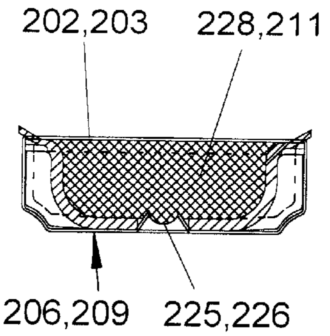
FIG. 27 is a cross sectional view of the plug-in connector of FIG. 20 in the fitting position and additionally with a sealant filling.

The figure numbers discussed below relate to FIGS. 20 to 60. FIGS. 20 to 60 show a plug-in connector 201 for hollow sections 202, 203 of insulating glass panes. The plug-in connector is preferably designed as a straight plug-in connector, but it may also be a corner angle as an alternative. The shape of the plug-in connector 201 is adapted to the interior space and the internal cross section of the hollow sections 202, 203 and is guided in a positive-locking manner at the hollow sections 202, 203 in the fitting position. FIGS. 24 and 25 show, e.g., the cross section of such a hollow section 202, 203 in their top parts.

The hollow sections 202, 203 form a spacer frame for insulating glass panes with one another. They are bent, e.g., in one piece or are fitted together from a plurality of pieces. The hollow sections 202, 203 have a preferably flat section bottom 208, which points toward the inside 205 of the frame and consequently toward the interior space between the panes. One or more perforation lines or other similar perforations, which make possible the access of the gases present in the interior space between the panes to a desiccant present in the hollow sections, may also be present in the bottom 208 of the section.

The hollow sections 202, 203 have an essentially rectangular cross section with two side walls 207 of the section joining the bottom 208 of the section at right angles and with a roof 209 of the section, which points toward the outside 206 of the frame. The roof 209 of the section may have a bevel at the corners and transitions into the side walls 207 of the section, as is shown, e.g., in FIGS. 23, 26 and 28. In the design variant shown in FIGS. 40 and 41, the roof 209 of the section has a step 234 in the corner area.

The hollow sections 202, 203 are butt-jointed at a connection point 204, and no gap or only a very small gap shall possibly be left. The plug-in connector 201, which seals the connection point 204 against the desiccant 212 present in the hollow sections 202, 203, is located here in the fitting position.

The hollow sections 202, 203 consist of metal. In the preferred embodiment, they are made of stainless steel and have an especially thin wall thickness of about 0.2 mm. Even though such sections have a relative dimensional stability in the corner area, they may undergo deformation in the area of the longer sides of the section, especially in the area of the bottom and the roof, during cutting off, storage and handling. Upright burrs or other, similar irregularities may also be present in these areas. As an alternative, the hollow sections 202, 203 may also be manufactured in any other manner desired and consist of, e.g., a drawn light metal section.

FIG. 58 shows a central longitudinal section of a basic shape of the plug-in connector 201; FIG. 59 shows a cross section; and FIG. 60 shows a view folded out from the longitudinal section from the underside. The plug-in connector 201 has essentially the shape of a U or a trough shape, which is formed by a plurality of webs 213, 214, 215 and is open toward the inside 205 of the frame. The plug-in connector 201 has a middle web 213, which points toward the outside 206 of the frame in the fitting position. Longitudinally extending side webs 214, which extend with their free web edges 216 to the bottom 208 of the section and stand up there, extend from the middle web 213 on both sides. Cross webs 215, which likewise reach the bottom 208 of the section and stand up there, extend from the middle web 213 on the front side. The height of the plug-in connector 201 is selected to be such that the middle web 213 is preferably in contact with the roof 209 of the section. The plug-in connector 201 is closed on both front sides as a result, so that no desiccant 212 can flow over the connection point 204.

One or more web openings 225 in the form of wall perforations or even trough-shaped depressions, which are used to accommodate the caulking 210 of the roof 209 of the section, are present in the middle web 213. To achieve this, the roof 209 of the section is pressed in the inwardly direction with a punch or another suitable tool, and the bead being formed during the deformation or the caulking 210 engages the openings 225 of the web in a positive-locking manner. The plug-in connector 201 is fixed in the hollow sections 202, 203 via the caulkings 210.

At least the side webs 214 preferably have a broadened foot surface 218, with which they stand up on the bottom 208 of the section and are in sealed contact, on the free web edges 216 pointing toward the inside 205 of the frame. The foot surfaces 218 may be formed in various ways.

In the preferred embodiment, the plug-in connector 201 is a stamped and bent part made of metal, especially steel plate. It preferably consists of a pretreated, so-called cold rolled strip. It is recommended in the case of this form to form the foot surfaces 208 by bent-off web flanges 217. The plug-in connector 201 may otherwise also consist of any other desired material, e.g., plastic, or even composites. It is possible to make the web flanges 217 in one piece with the side webs 214. Depending on the embodiment, it is also possible to increase the wall thickness of the side webs 214 at the web edges 216 and to create a broader foot surface 218 as a result.

The web flanges 217 laterally project from the side webs 214. In the preferred embodiment, the web flanges 217 point to the outside and project outwardly beyond the side webs 214. As an alternative, they may also be directed inwardly toward the hollow space 218 of the trough shape. In the preferred embodiment shown, the outwardly directed web flanges 217 are in contact with the side walls 207 of the section and guide the plug-in connector 201 laterally in the hollow sections 202, 203.

A middle stop 224 is arranged on the web flanges 217 at the connection point 204 or in the middle of the plug-in connector 201. FIGS. 31, 33 and 34 show it in detail. The middle stop may have various designs.

In the preferred embodiment, the middle stop 224 consists of a free-cut, fixed stop boss projecting laterally over the edge of the flange. The hollow sections 202, 203 strike the middle stop 224 when being pushed on the plug-in connector 201, so that the plug-in connector 201 is seated centrally in the hollow sections 202, 203 in the fitting position.

As is illustrated in FIG. 14, the stop boss 224 may also be bent obliquely toward the inside 205 of the frame. As a result, it reliably meets the relatively dimensionally stable corner area of the hollow sections 202, 203 and reliably assumes the stop function even in the case of thin-walled hollow sections 202, 203. The stop boss 224 is preferably designed as a very pointed and especially thin-walled boss, which can dig itself into the front walls of the hollow sections 202, 203 and makes possible a sealing closure of the section at the connection point 204 as a result. FIGS. 33 and 34 show that the stop bosses 224 may be pinched or pressed to reduce their wall thickness. The semicircular dashed line indicates the cross section 232 and the reduction in the wall thickness.

As an alternative, the stop bosses 224 may also be designed corresponding to DE-94 11 067 U1 as unilaterally acting wedge bosses, which are arranged in an offset pattern or are directed against one another. In another variant, middle stops in the form of spring bosses or the like are also possible.

The front-side cross webs 215 may also have a broadened foot surface 218 toward the inside 205 of the frame for sealed contact with the bottom 208 of the section. In the preferred embodiment, they have web flanges 217, which project on the front side, pass over into the side web flanges 217 and form with same a broad front-side tongue with an especially large foot surface 218. At the ends, the front-side web flanges 217 may have a bent-up, oblique stop boss 231 or step to facilitate the introduction into the hollow sections 202, 203. The front-side web flanges 217 may have different lengths in the different embodiments according to FIGS. 20 through 60. They are especially long for accommodating additional moldings and functional parts in the embodiment according to FIGS. 36, 37, 39, 40, 53, 54, 57 and 58.

The foot surfaces 218 form with one another a broad sealing surface 221, which is circular at the edge and with which the plug-in connector 201 is sealingly in contact with the bottom 208 of the section. Due to this sealing action, dust of the granular material cannot reach the connection point 204 inside the frame.

In the embodiment according to FIGS. 20 through 22, the middle web 213 is additionally depressed in the area of the connection point 204 or the middle of the plug-in connector 201. The depression 220, directed at right angles to the longitudinal axis of the connector, reaches the bottom 208 of the section and forms an additional, broad foot surface 218 there, which is in sealed contact with the connection point 204 in the fitting position. In addition, the foot surface 218 smoothens and straightens the edges of the bottom of the section at the connection point 204. In particular, warping, distortions or other deformations generated during the cutting off the hollow sections 202, 203 are absorbed and straightened. The foot surface 218 of the depression 220 is at the same level as all other foot surfaces 218 and it enlarges the sealing surface 221. The depression 220 has the same wall thickness and passes over into the adjoining web flanges 217 and passes over into same. If the bottom 208 of the section has a perforation with upright hole edges, the foot surfaces 218 or the sealing surface 221 may have suitable recesses not shown for receiving them.

As is also illustrated in FIGS. 20 through 22, one or more bulging side beads 219 may be arranged on the side webs 214. They are formed, e.g., by deformations of the side web walls. The side beads 219 extend up to the side wall 207 of the section and are sealingly in contact with it there in the fitting position. They have a preferably flat outer wall for sealed contact with the side wall 207 of the section. The side beads 219 also extend up to the outer edge of the web flanges 217 and guide, together with same, the plug-in connector 201 in the hollow sections 202, 203. The walls of the side webs 214 may be made thin and without broadened foot surfaces 218 in the contact area of the side beads 219. The side beads 219 are adapted to the inner shape of the hollow sections 202, 203, which is illustrated in the cross-sectional representation in FIG. 26. The side beads 219 may have indentations or the like especially in the roof or corner area for adaptation to the shape and for sealed contact of the section.

In the embodiment according to FIGS. 20 through 22, two partial troughs and two hollow spaces 228 are formed by the depression 220 of the middle web 213. Four side beads 219 are present here, which are arranged approximately centrally at the troughs and are axially spaced from the connection point 204 and from the front sides of the plug-in connector. The side beads 129 have a limited length, which is markedly shorter than the overall length of the plug-in connector 201.

A free space, into which the desiccant 212 can flow, is formed in the fitting position of the plug-in connector 201 over the web surfaces 217 and between the setback side webs 214 as well as the side walls 207 of the section and the roof 209 of the section. The sealed contact of the foot surfaces 218 now prevents desiccant 212 or dust of the granular material from penetrating between the plug-in connector 201 and the roof 208 of the section and to the connection point 204. The free spaces 229 are limited axially by the side beads 219, so that the desiccant 212 can enter only over a partial area of the plug-in connector 201.

A hollow space 223 is formed in the embodiment according to FIGS. 20 through 22 in the fitting position due to the depression 220 as well as the adjoining web flanges 217 and the side beads 219. This hollow space 223 is empty in the embodiment according to FIGS. 24 and 25. The desiccant 212 cannot reach the hollow space 223 from the front sides due to the sealed contact of the middle web 213 with the roof 209 of the section.

Figure 28:
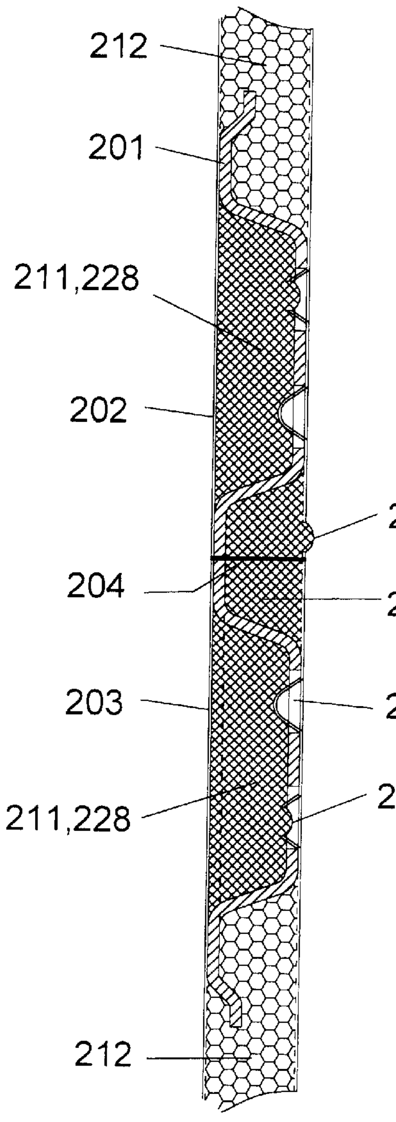
FIG. 28 is a longitudinal sectional view of a plug-in connector of FIG. 20 in the fitting position and additionally with a sealant filling.
Figure 29:
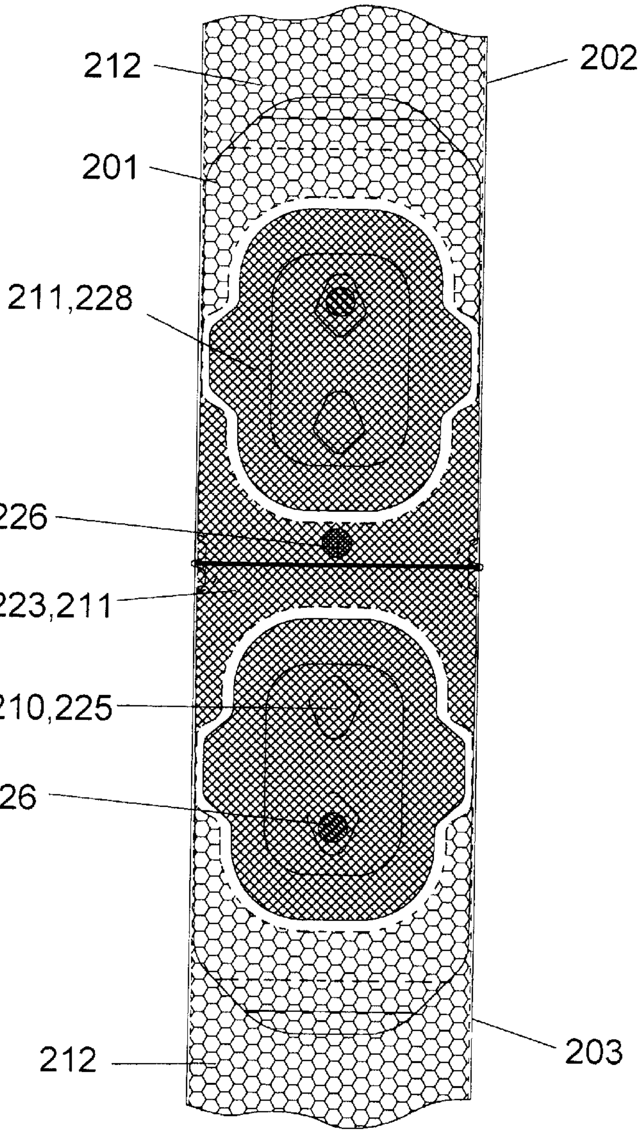
FIG. 29 is a bottom view of the plug-in connector of FIG. 20 in the fitting position and additionally with a sealant filling.
Figure 35:
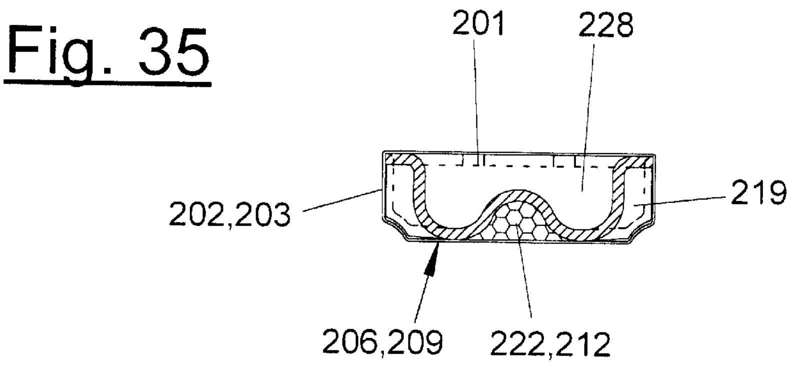
FIG. 35 is a cross sectional view of the plug-in connector of FIG. 30 in the fitting position in connection with desiccant and sealant.
Figure 36:
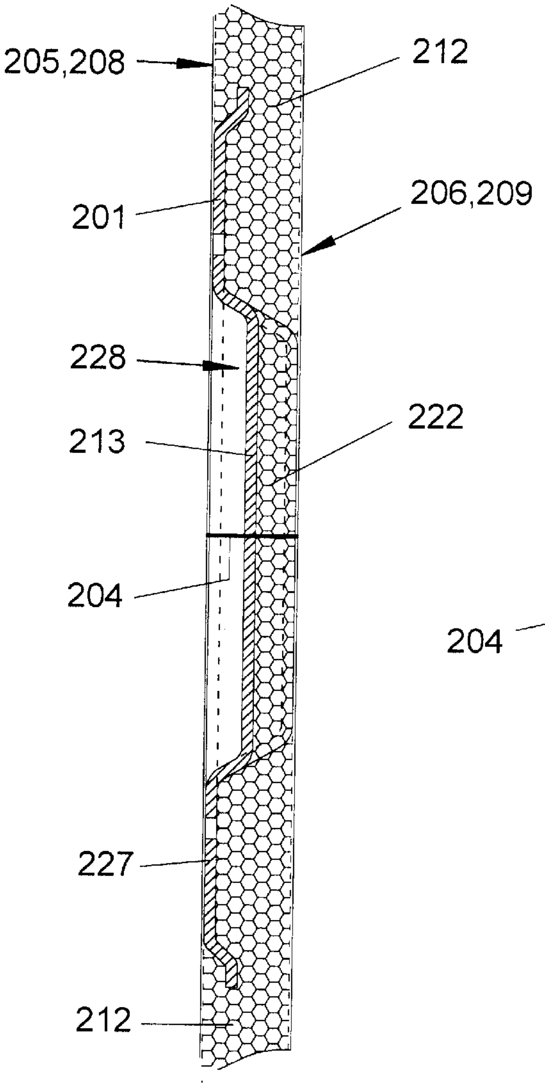
FIG. 36 is a longitudinal sectional view of a plug-in connector of FIG. 30 in the fitting position in connection with desiccant and sealant.
Figure 37:
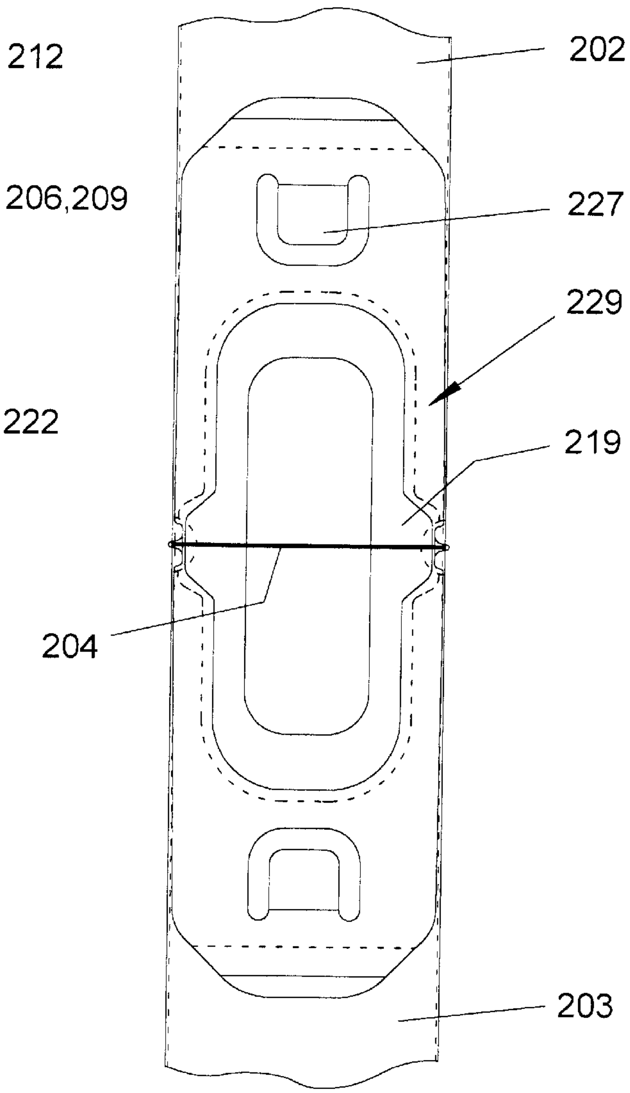
FIG. 37 is a bottom view of the plug-in connector of FIG. 30 in the fitting position in connection with desiccant and sealant.
Figure 38:
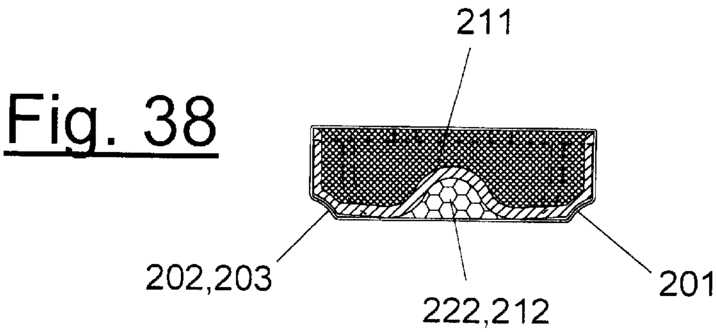
FIG. 38 is a cross sectional view of the plug-in connector of FIG. 30 in the fitting position and additionally with a sealant filling.
Figure 39:
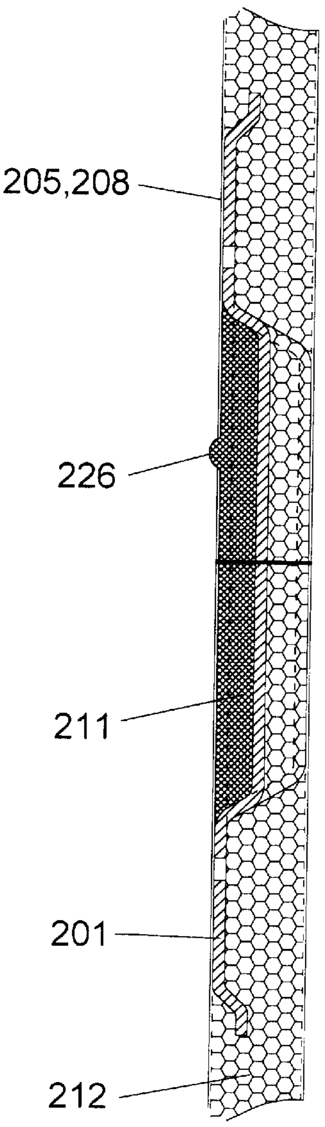
FIG. 39 is a longitudinal sectional view of a plug-in connector of FIG. 30 in the fitting position and additionally with a sealant filling.
Figure 40:
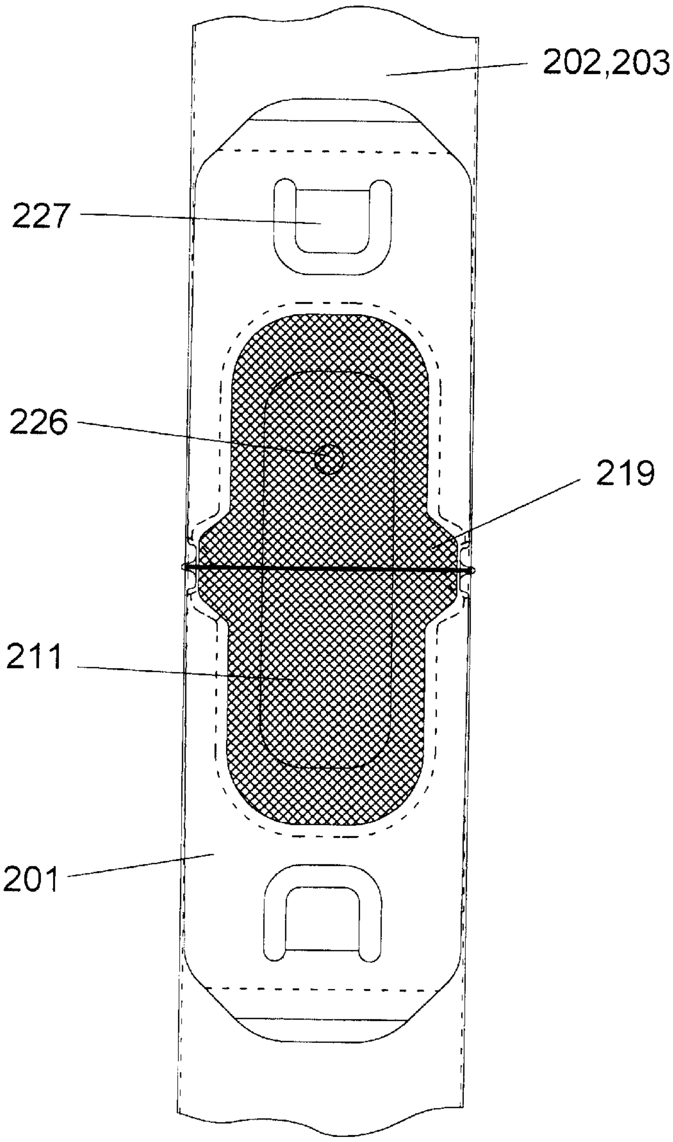
FIG. 40 is a bottom view of the plug-in connector of FIG. 30 in the fitting position and additionally with a sealant filling.

In the variant according to FIGS. 28 and 29, this hollow space 223 is filled with a sealing compound 211, which is filled in from the outside of the frame through a hole and injection opening 226 in the roof 209 of the section. The sealing compound 211 fills out the entire hollow space 223 and it additionally seals at the connection point 204. The sealing compound 211 may consist of any suitable material, e.g., butyl or a plastic foam. The sealing compound 211 may be introduced after or during the insertion of the plug-in connector 201 into the hollow sections 202, 203. However, it may also be arranged in the plug-in connector 201 in advance.

In addition, the hollow spaces 228, which are located under the webs 213, 214, 215 and are open toward the inside 205 of the frame, may also be filled with a sealing compound 211. To do so, one of the caulkings 219 is drilled or perforated from the outside 206 of the frame. The sealing compound 211 is filled in through the injection opening 226 thus formed.

FIGS. 30 through 33 show a variant of the plug-in connector 201 with a plurality of modifications of the trough shape compared with FIGS. 20 through 29.

According to FIGS. 30 and 31, the middle web 213 has no depression 220. The middle web 213 has, instead, a longitudinally extending indentation 222, which is open on the front side. As a result, the plug-in connector 201 has an omega-shaped cross section. The connection point 204 is bridged over due to this channel-like indentation 22 and the desiccant 212 can flow over the connection point 204. FIGS. 35, 36, 38 and 39 show this fact in the fitting position.

In this design with the continuous middle web 213, there are only two side beads 219, which are arranged centrally and are located at the level of the connection point 204 or the middle stops 224. The side beads 219 may be sealingly in contact with the side walls 207 of the section with their outer wall and block the lateral flow of the desiccant 212 in this case as well. While the sealing action is maintained, the desiccant 212 can move very far to the connection point 204 in this embodiment. This is favorable and desirable because of the diffusion phenomena in the area of the connection point 204. The desiccant 212 now acts mainly toward the outside 206 of the frame.

In FIGS. 20 through 22, the plug-in connector 201 is held in the hollow sections 202, 203 by the caulkings 210. As an alternative or in addition, one or more retaining elements 227 are present in the variant according to FIGS. 30 and 31. For example, spring bosses 227, which are bent off in the downwardly direction and elastically brace themselves against the bottom 208 of the section, are arranged on the web flanges 217 projecting on the front side. The spring bosses 227 are directed against the direction of pushing in and prevent the plug-in connector 201 from being withdrawn from the hollow sections 202, 203.

FIGS. 35 through 40 show the plug-in connector 201 according to FIGS. 30 and 31 in the fitting position. The hollow space 228 under the webs 213, 214, 215 is empty in FIGS. 35 through 37. In the variant according to FIGS. 38 through 40, the hollow space 28 is filled with a sealing compound 211. This may be filled in, e.g., through an injection opening 226 in the bottom 208 of the section. The sealing compound 211 fills out the entire area around the connection point 204 and reaches into the side beads 219.

Figure 41:
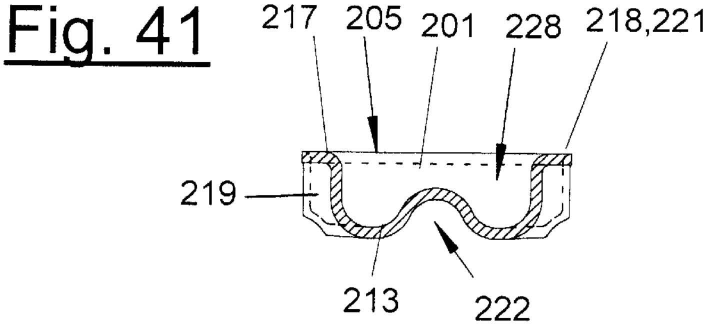
FIG. 41 is a cross sectional view of a plug-in connector according to another embodiment of the invention.
Figure 42:
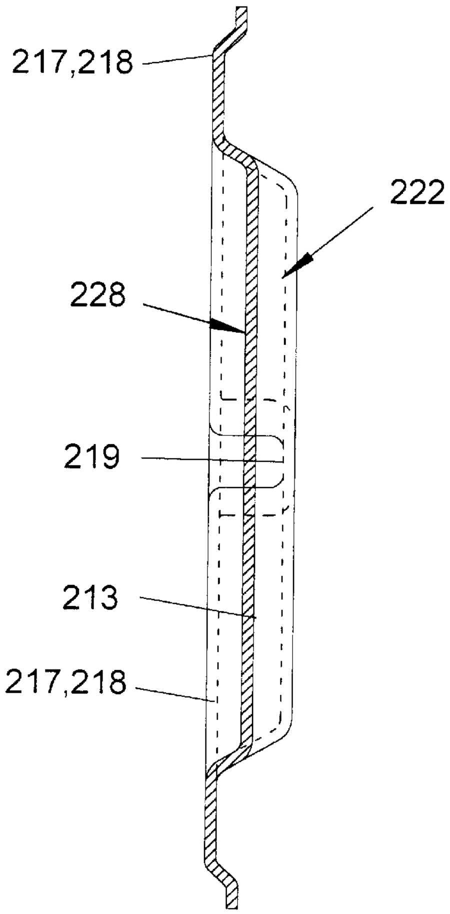
FIG. 42 is a longitudinal sectional view of a plug-in connector of FIG. 41
Figure 43:
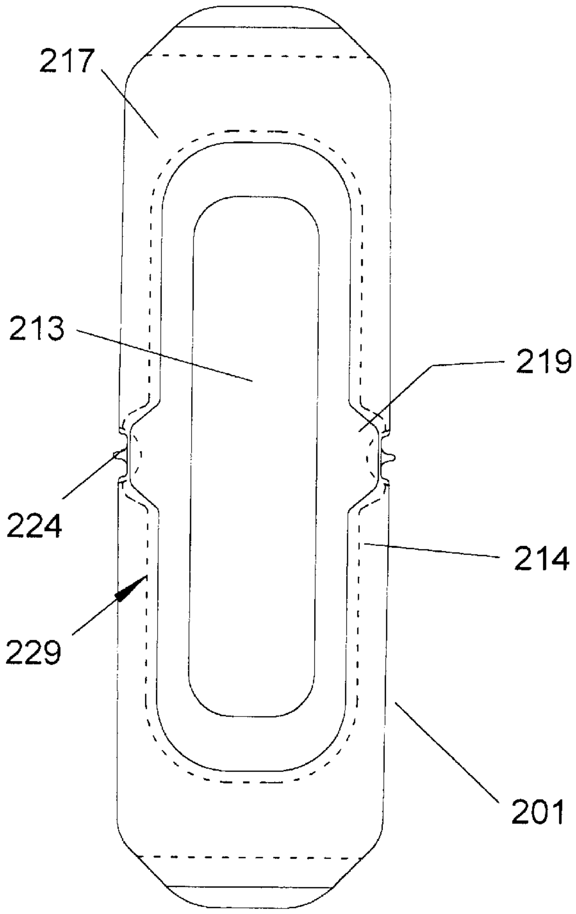
FIG. 43 is a bottom view of the plug-in connector of FIG. 41.

FIGS. 41 through 43 show a variant of FIGS. 30 and 31. The retaining elements 227 are omitted here. The middle web 213 is extended, instead, and the hollow spaces 228 is correspondingly enlarged. The plug-in connector 201 is held mainly by friction. It has some oversize compared with the internal dimensions of the section for this purpose especially on the web flanges 217 in order to absorb any tolerances and to bring about a tension in the hollow sections 202, 203.

Figure 44:
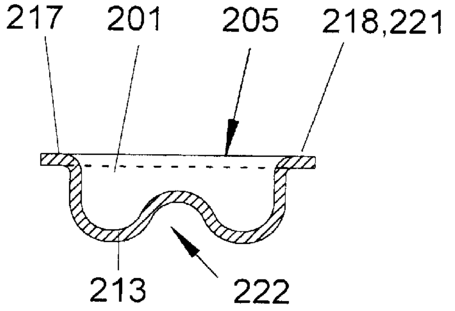
FIG. 44 is a cross sectional view of a plug-in connector according to another embodiment of the invention.
Figure 45:
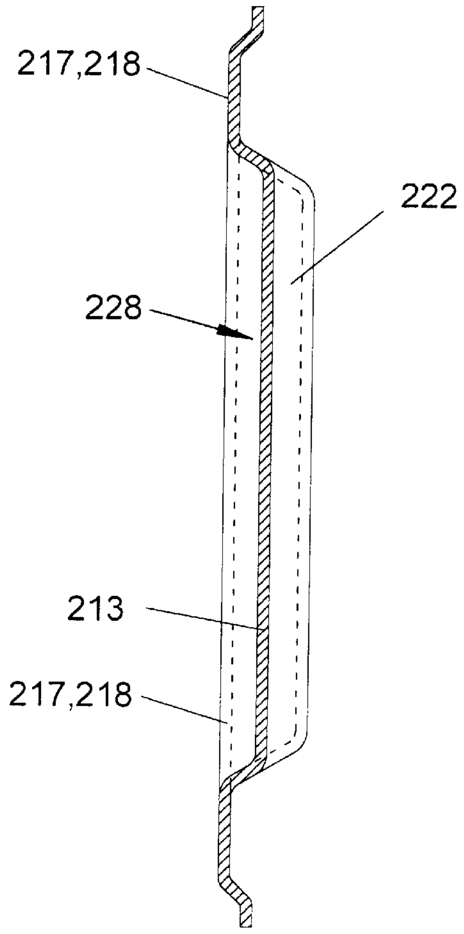
FIG. 45 is a longitudinal sectional view of a plug-in connector of FIG. 44
Figure 46:
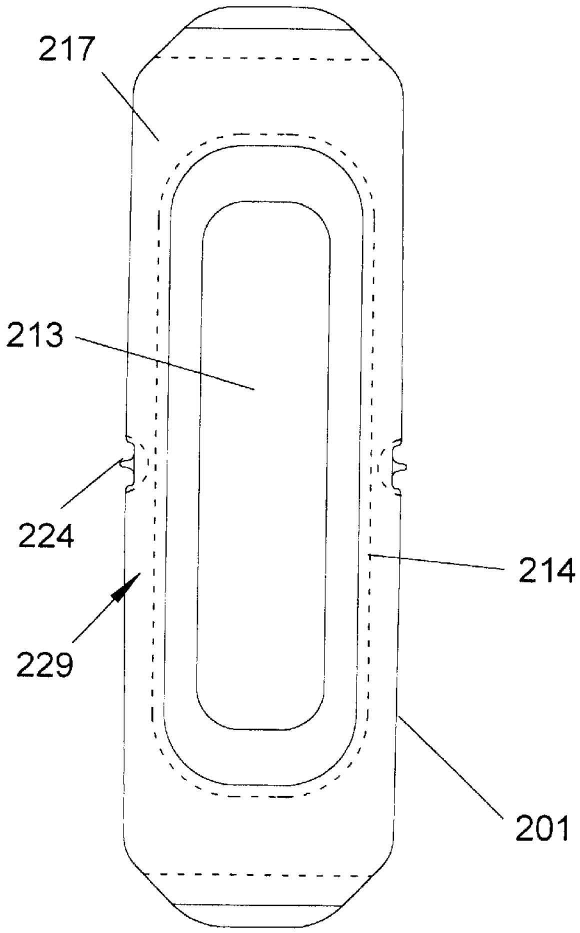
FIG. 46 is a bottom view of the plug-in connector of FIG. 44.

FIGS. 44 through 46 show another variant of the plug-in connector 201. It has a design similar to that shown in FIGS. 41 through 43. However, the plug-in connector 201 has no side beads 219 in FIGS. 44 through 46. The side webs 214 are set back here over the entire length in relation to the web flanges 217 and the side walls 207 of the section. A continuous free space 229 is formed as a result, through which the desiccant 212 can move from one hollow section 202 into the other hollow section 203 past the connection point 204. This plug-in connector 201 may additionally have an indentation 222 for the flow of the granular material.

Figure 47:
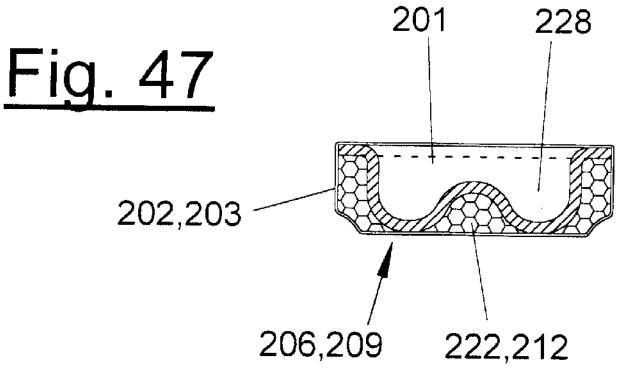
FIG. 47 is a cross sectional view of the plug-in connector of FIG. 44 in the fitting position and additionally with a sealant filling.
Figure 48:
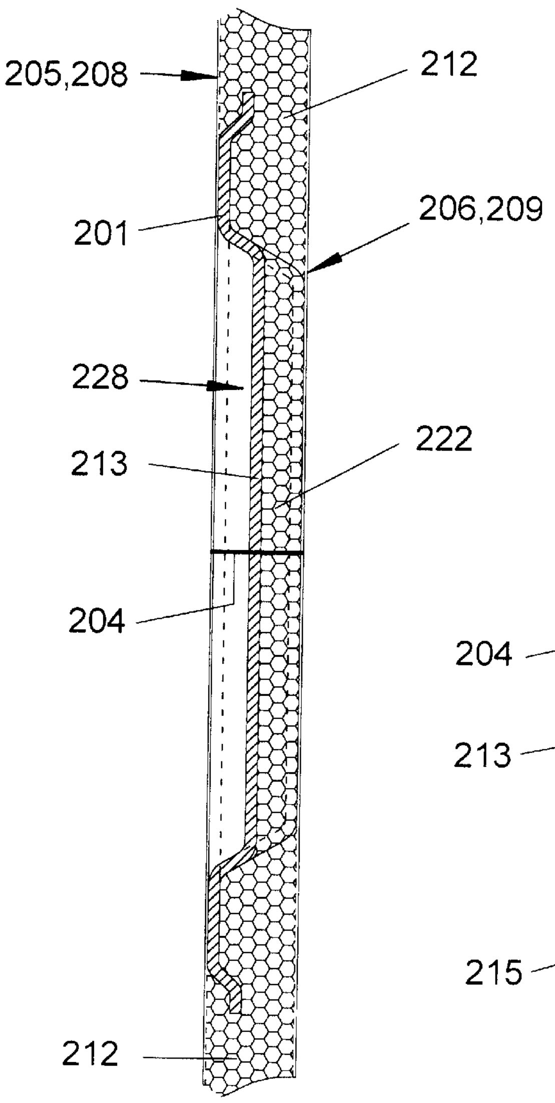
FIG. 48 is a longitudinal sectional view of a plug-in connector of FIG. 44 in the fitting position in connection with desiccant and sealant.
Figure 49:
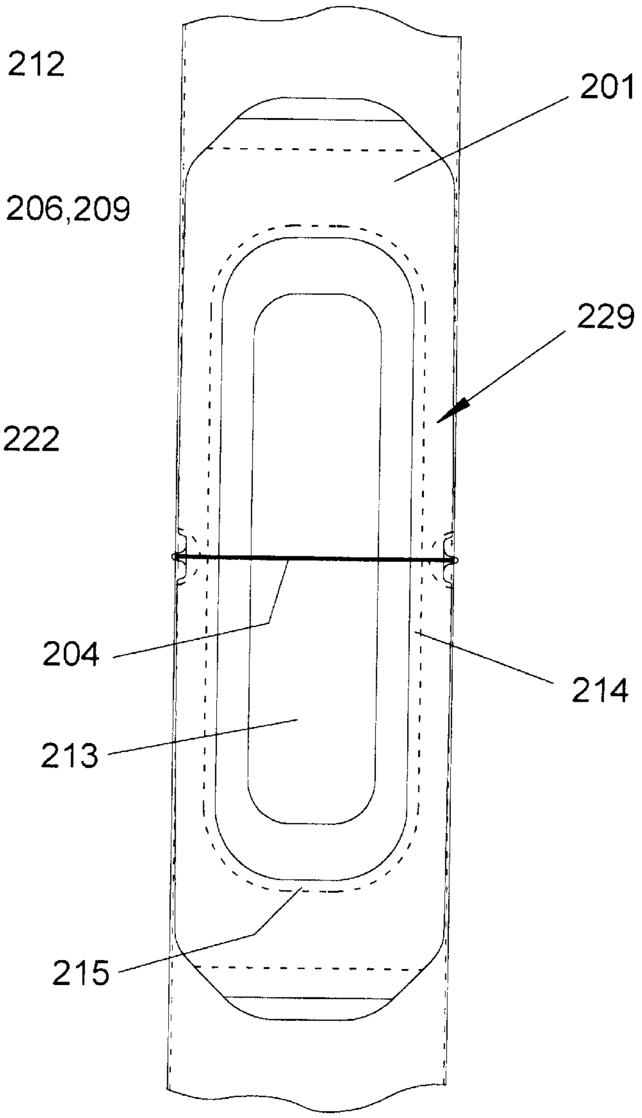
FIG. 49 is a bottom view of the plug-in connector of FIG. 44 in the fitting position in connection with desiccant and sealant.
Figure 50:
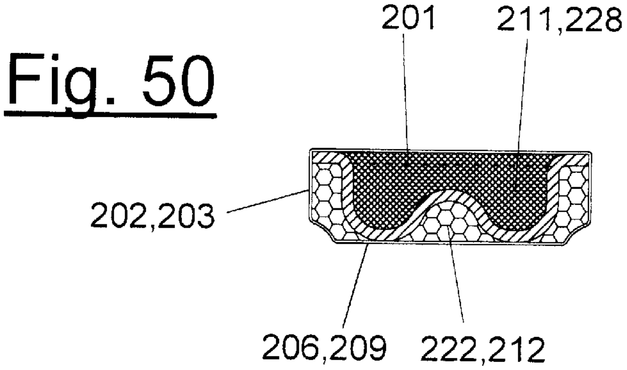
FIG. 50 is a cross sectional view of the plug-in connector of FIG. 44 in the fitting position and additionally with a sealant filling.
Figure 51:
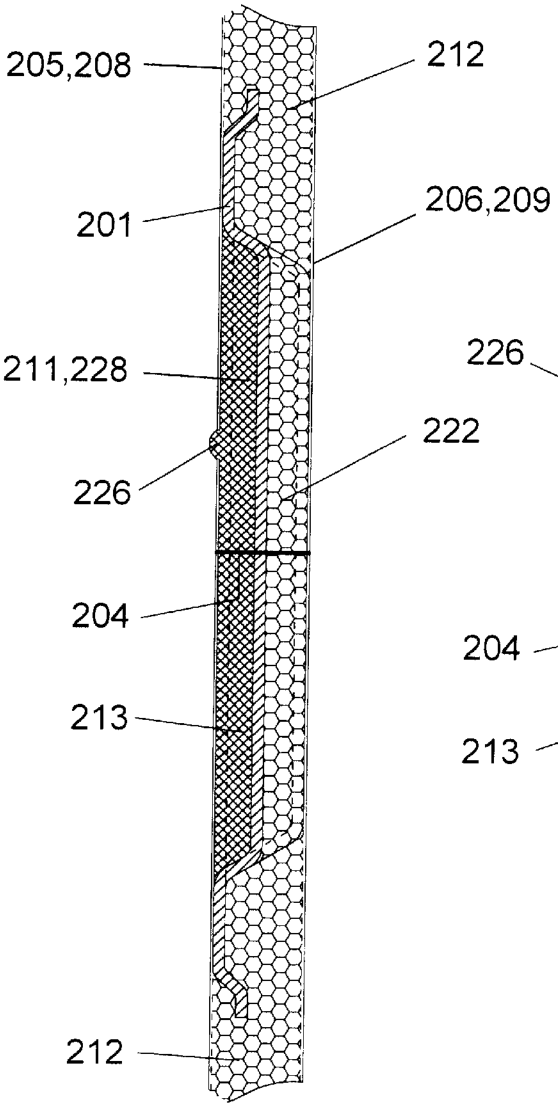
FIG. 51 is a longitudinal sectional view of a plug-in connector of FIG. 44 in the fitting position and additionally with a sealant filling.
Figure 52:
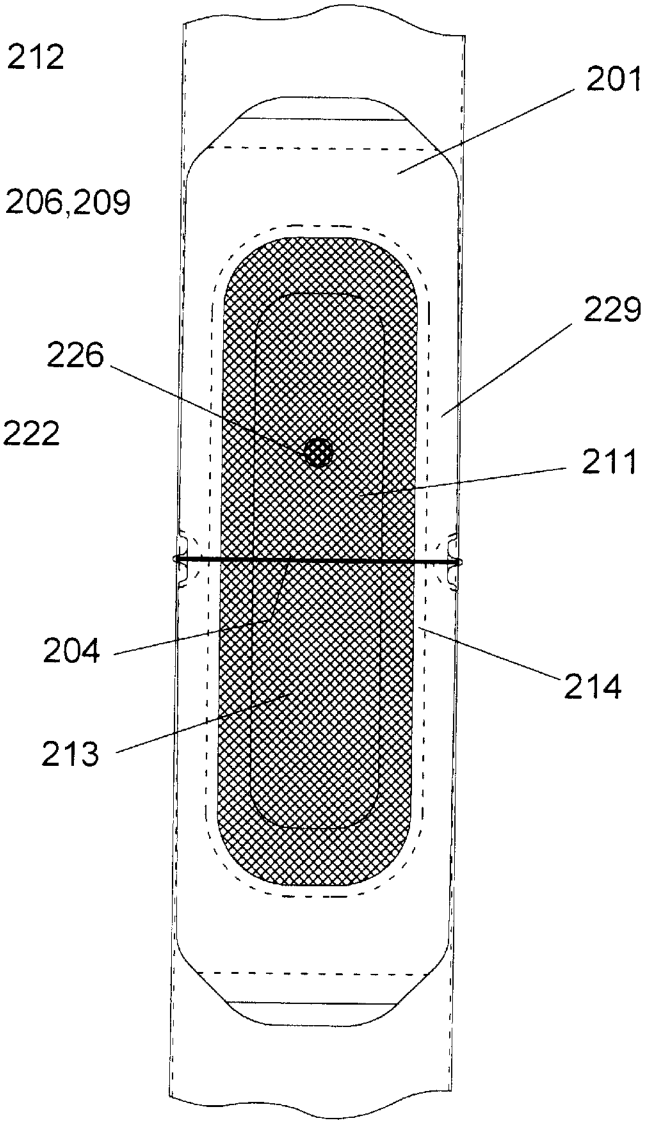
FIG. 52 is a bottom view of the plug-in connector of FIG. 44 in the fitting position and additionally with a sealant filling.

FIGS. 47 through 49 show the flow situation for the desiccant 212. The hollow space 228 under the middle web 213 is again empty here. In the variant according to FIGS. 40 through 42, this hollow space 228 is filled with a sealing compound 211. This is introduced through an injection opening 226 in the bottom 208 of the section. As an alternative, the middle web 213 may also be drilled from the outside 206 of the frame.

FIGS. 42 through 50 show another design variant of the plug-in connector 201 and the hollow sections 202, 203 according to FIGS. 20 through 29.

The plug-in connector 201 has two side support humps 230 on the two web flanges 217 projecting over the cross webs 215 on the front side next to the stop boss 231. These [support humps] are located in the corner areas of the front end of the plug-in flanges 217 and have stop faces, which are beveled in height and are at the same time obliquely bent laterally toward the middle of the connector, and onto which the front walls of the hollow sections 202, 203 can slide up with possible deformations.

The support humps 230 and optionally also the stop boss 231 have a shape and especially a height that is adapted to the shape of the hollow sections 202, 203 in the area of the side walls 207 of the section and of the corners and transitions of the roof 209 of the section. As is illustrated in FIGS. 59 and 60, the roof 209 of the section has a laterally bent step 234 at the corners. At least the support humps 230 are coordinated in height with this step 234 of the roof of the section and come into contact with its underside. FIG. 59 shows this arrangement in Section A—A.

The side webs 214 with the side beads 219 are also adapted to this design of the side wall of the hollow sections 202, 203. As is illustrated by section B—B in FIG. 41, the side webs 214 and the side beads 219 may have a stepped shape imitating the step 234 of the roof of the section and come into contact with the side wall 207 of the section and the transition in the roof area essentially two-dimensionally as a result. FIGS. 53 through 56 show a plug-in connector 201 in itself with this shape and with the sections A—A and B—B. The assembly situation of the plug-in connector 201 with the hollow sections 202, 203 and corresponding sections A—A and B—B are shown in FIGS. 57 through 60.

In the embodiment shown in FIGS. 53 through 60, the stop bosses 231 and the support humps 230 have a height that is lower corresponding to the position of the step than the middle web 213. In a variant, which is not shown, and in reference to the shape of the hollow section according to FIGS. 53 through 60, the height of the support humps 230 and of the stop boss 231 may also be greater and approximately correspond to the height of the middle web. At least the support humps 230 can now be in contact with the side wall 207 of the section on the roof 209 of the section or its corners and transitions. They may have a corresponding bevel or arch on the edges of the hump for this purpose.

As is illustrated in FIGS. 53 through 60, the plug-in connector 201 may have one or more longitudinally extending reinforcing beads 233 on the front-side web flanges 217 and the depression 220 and the foot surfaces 218 and sealing surfaces 221 located there. The web flanges 217 have a somewhat broader and centrally arranged reinforcing bead 233. This may cross over the central, upright perforation line in the bottom 208 of the section and sealingly cover it. A plurality of parallel reinforcing beads 233, which are optionally of different widths, are present at the depression 220.

Various modifications of the embodiment shown are possible. The features of the different embodiments shown may be combined with one another and exchanged as desired to obtain other embodiments. The shapes of the webs 213, 214, 215 and the fastening of the plug-in connectors 201 in the hollow sections 202, 203 are also variable. The retaining elements 227, in particular, may be varied as desired for this purpose. The arrangement and the design of the middle stops 224, which may optionally also be arranged at the side beads 219 and/or at the middle web 213, are also variable.

While specific embodiments of the invention have been shown and described in detail to illustrate the application of the principles of the invention, it will be understood that the invention may be embodied otherwise without departing from such principles.

What is claimed is:

1. The plug-in connector for hollow sections, the connector comprising:

a middle web;

first and second side webs arranged at opposite lateral sides of said middle web to form one of a U-shaped or box shaped cross section for insertion into, and connection of, the hollow sections;

a transition portion between each of said side webs and said middle web;

a plurality of stops on said transition portion in an area of a connection point of the hollow sections, said stops having a cross section of a convexly outwardly arched shape with the arch passing over into said middle web and an adjacent one of said side webs.

2. The plug-in connector in accordance with claim 1, wherein:

said stops are directed in opposite directions and are arranged on both sides of said connection point, each of said stops act in one direction.

3. The plug-in connector in accordance with claim 1, wherein:

said webs and said transition portion are formed from one of a punched and bent part of sheet metal, said stops are formed by one of cutting and chiseling out of said sheet metal.

4. The plug-in connector in accordance with claim 1, wherein:

said stops have a height of 0.5 mm to 1.5 mm at a vertex.

5. The plug-in connector in accordance with claim 1, wherein:

said stops have a front side pointing toward said connection point with a substantially straight stop edge, said stop edges of said stops are set back from said connection point.

6. The plug-in connector in accordance with claim 1, wherein:

said side webs have a far edge positioned diametrically opposite said middle web, said far edges have additional fixed stops in said area of said connection point.

7. The plug-in connector in accordance with claim 1, wherein:

said side webs have a far edge positioned diametrically opposite said middle web, said far edge defining an opening in said area of said connection point.

8. The plug-in connector in accordance with claim 1, further comprising:

an elastic sealing body connectable to said webs prior to insertion of said webs into the hollow sections, said elastic sealing body projecting over a contour of said webs in said area of said connection point.

9. The plug-in connector in accordance with claim 8, wherein:

said sealing body is formed of a plastic foam.

10. The plug-in connector in accordance with claim 8, wherein:

said webs define a hollow space open toward said connection point;

said sealing body being arranged in said hollow space.

11. The plug-in connector in accordance with claim 8, wherein:

said sealing body is fastened to one of said webs by a bonded connection.

12. The plug-in connector in accordance with claim 8, wherein:

said middle web includes a projection in said area of said connection point, said projection having a shape to form an arch in said sealing body extending beyond side webs.

13. The plug-in connector in accordance with claim 8, wherein:

one of said webs includes a plurality of retaining elements.

14. The plug-in connector in accordance with claim 1, wherein:

said stops have a guide slope for wedging into, and tightening around, a first of the hollow sections slid onto the webs in a first direction, said stops also have a stop edge for blocking movement of a second of said hollow sections slid onto the webs in a second direction opposite said first direction.

15. The plug-in connector in accordance with claim 1, wherein:

said stops have a guide slope for wedging into and deforming a first of the hollow sections slid onto the webs in a first direction, said stops also have a stop edge for blocking movement of a second of said hollow sections slid onto the webs in a second direction opposite said first direction;

said transition portion includes a first transition portion between said first side-web and said middle web;

said transition portion includes a second transition portion between said second side web and said middle web.

16. A plug-in connector for hollow sections, the connector comprising:

a middle web;

first and second side webs arranged at opposite lateral sides of said middle web to form one of a U-shaped or box shaped cross section for insertion into, and connection of, the hollow sections;

a transition portion between each of said side webs and said middle web;

a plurality of stops on said transition portion in an area of a connection point of the hollow sections, said stops having a front side pointing toward said connection point with a substantially straight stop edge, said stops edge having a first side and having a second side with a guide slope.

17. The plug-in arrangement for a hollow section, the arrangement comprising:

a hollow section;

a connector insertable into said hollow section, the connector comprising;

a middle web;

first and second side webs arranged at opposite lateral sides of said middle web to form one of a U-shaped or box shaped cross section for insertion into, and connection of, the hollow sections;

transition portions between each of said side webs and said middle web;

a stop on said transition portions in an area of a connection point of the hollow sections, said stop having a guide slope for wedging into and deforming said hollow section slid onto said webs.

18. The plug-in connector for hollow sections of spacers of insulating glass panes, the plug in connector comprising:

an essentially U-shaped or boxed-shaped cross sectional part having a first side web and a second side web with a first web edge having a fixed stop acting in a first direction and with a first web opposite edge and with a second web edge having a fixed stop acting in an opposite second direction and with a second web opposite edge, said first fixed stop and said second fixed stop being arranged adjacent to a connection point of first and second hollow sections connected by the plug-in connector, said essentially U-shaped or box-shaped cross sectional part having a first guide slope on one side of the said connection point and associated with said first fixed stop and having a second guide slope on an opposite side of said connection point and associated with said second fixed stop, said first guide slope being associated with said first web opposite edge and said second guide slope being associated with said second web opposite edge.

* * * * *